(12) United States Patent
Michiie et al.

(10) Patent No.: US 7,710,613 B2
(45) Date of Patent: May 4, 2010

(54) IMAGE INFORMATION APPARATUS

(75) Inventors: Norio Michiie, Tokyo (JP); Hiromitsu Shimizu, Tokyo (JP); Yuriko Obata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1038 days.

(21) Appl. No.: 11/079,277

(22) Filed: Mar. 15, 2005

(65) Prior Publication Data
US 2005/0200915 A1 Sep. 15, 2005

(30) Foreign Application Priority Data
Mar. 15, 2004 (JP) .............................. 2004-073005

(51) Int. Cl.
*H04N 1/04* (2006.01)
*H04N 1/40* (2006.01)
*G06K 15/00* (2006.01)

(52) U.S. Cl. ...................... 358/474; 358/471; 358/486; 358/1.16; 358/1.17

(58) Field of Classification Search ................. 358/403, 358/1.16
See application file for complete search history.

(56) References Cited

U.S. PATENT DOCUMENTS

| | | | | |
|---|---|---|---|---|
| 5,303,070 A | * | 4/1994 | Christ | ........................ 358/474 |
| 5,873,119 A | * | 2/1999 | Khandekar et al. | ........... 711/169 |
| 6,333,795 B1 | * | 12/2001 | Kaji | ............................ 358/474 |
| 6,449,064 B1 | * | 9/2002 | Hattori et al. | ................ 358/403 |
| 2002/0040415 A1 | * | 4/2002 | Moteki et al. | ................ 710/260 |
| 2004/0169880 A1 | * | 9/2004 | Nakanishi et al. | ........... 358/1.15 |

FOREIGN PATENT DOCUMENTS

| | | | |
|---|---|---|---|
| JP | 10079843 A | * | 3/1998 |
| JP | 2950962 | | 7/1999 |
| JP | 2000261641 A | * | 9/2000 |
| JP | 2002-135544 | | 5/2002 |

* cited by examiner

*Primary Examiner*—Mark K Zimmerman
*Assistant Examiner*—Fan Zhang
(74) *Attorney, Agent, or Firm*—Oblon, Spivak, McClelland, Maier & Neustadt, L.L.P.

(57) ABSTRACT

An image information apparatus includes image input devices that read images on both sides of an original in parallel, a local memory that temporarily stores one or more image data read by the image input devices, and a hard disk device that stores the same image data that is stored in the local memory. A PCI bus, which serves as a transfer path for the image data on both the sides, and a PCI transfer controller, which controls communication via the PCI bus, are provided between the image input devices and the local memory. In addition, transfer units, which pass the image data on both the sides read by the image input devices to the PCI transfer controller in parallel and individually, is provided on the image input devices.

11 Claims, 18 Drawing Sheets

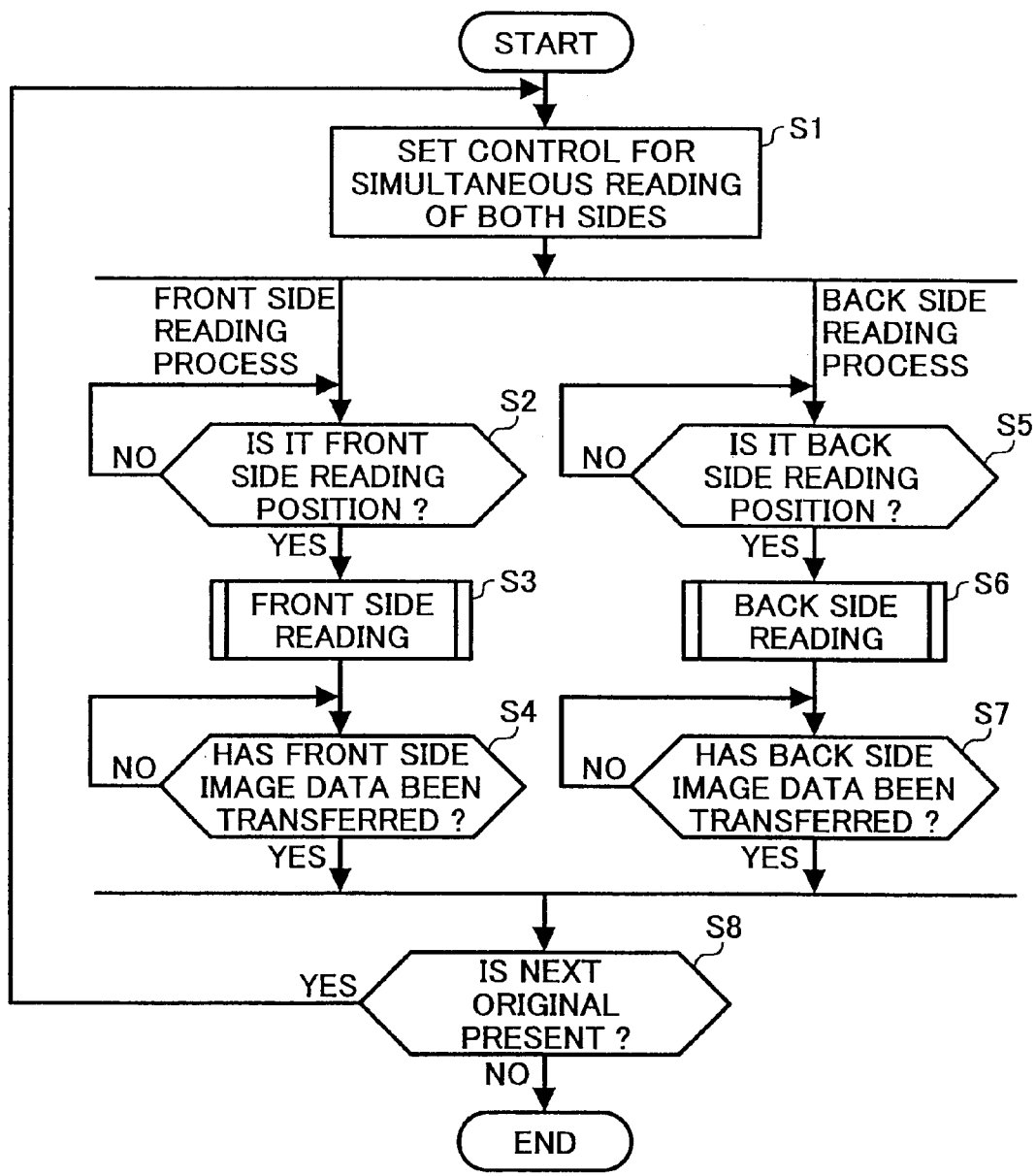

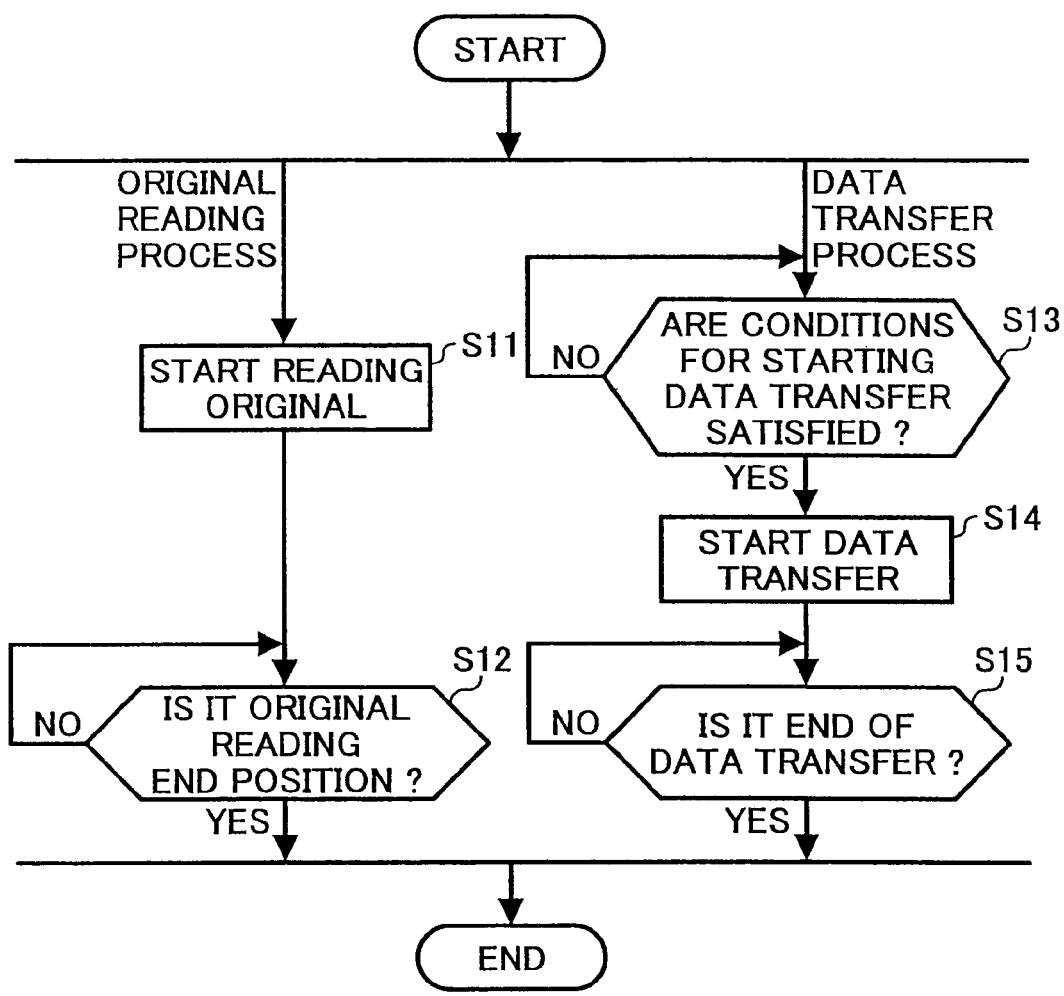

IMAGE INFORMATION APPARATUS

CROSS-REFERENCE TO RELATED APPLICATIONS

The present document incorporates by reference the entire contents of Japanese priority document, 2004-073005 filed in Japan on Mar. 15, 2004.

BACKGROUND OF THE INVENTION

1) Field of the Invention

The present invention relates to image information apparatuses such as digital copying machines, facsimile apparatuses, printers, scanners, network file servers, and digital multifunction products.

2) Description of the Related Art

Considerable progress has been made in recent years in the information processing related technology. Similarly, remarkable improvement has been made in the data transfer rates of large capacity storages, and the data compression ratios and the processing speeds of data compressing units.

It has become common to connect, as secondary storages, large and high-speed capacity storages to image information apparatuses. When such secondary storages are provided, it becomes possible to employ a configuration capable of inputting and outputting a plurality of image data in parallel. However, in this case, how efficiently the processing for storing (writing) image data in and reading image data from the secondary storage is performed becomes an important factor that decides the processing efficiency.

Assume that a variety of image inputting and outputting units are connected to an image information apparatus. In this case, it is difficult with the conventional memory control to maintain the processing efficiency by making the most of abilities of the secondary storage and the data compressing unit. One approach to solve this problem is to use a memory control system that employs a DMA for managing acquisition and release of resources for realizing maximum efficiency of use according to a processing ability of the secondary storage.

Precisely, in the conventional technique disclosed in Japanese Patent No. 2,950,962, images on a front side and a back side of an original are read in parallel, the image data of the front side and the image data of the back sides are connected by a unit of one line and stored in a buffer memory. The connected image data are separated into image data on the front side and image data on the back side when outputting the image data to the next stage. On the other hand, the image data can be output to the next stage as is, i.e., without separating.

Moreover, in the conventional technique disclosed in Japanese Patent Application Laid-open No. 2002-135544, images on a front side and a back side of an original are read in parallel, the image data of the front side and the image data of the back side are connected by a unit of one line. The connected image data is stored in a buffer memory (image memory), and simultaneously, read out and directly transferred to a hard disk. As a result, transfer of the image data to the hard disk can be started before writing of the image data in the buffer memory ends.

FIG. 10B is an example of a structure of a conventional digital multifunction product. In this digital multifunction product, image data on a front side and a back side of an original are respectively transferred to a secondary storage in parallel through, for example, a peripheral component interconnect (PCI) bus. Precisely, each of image input devices 133 and 134, which can be CCDs, read images on the front side and the back side of the original in parallel. The image data on the front side is stored in a frame memory 135a and the image data on the back side is stored in a frame memory 135b.

A transfer unit 162 reads out, via a selector 161, a predetermined amount of image data from the frame memory 135a with a delay of, for example, a predetermined time from the start of reading of the images by the image input devices 133 and 134, and passes the read image data to a PCI transfer controller 152. The PCI transfer controller 152 transfers the image data to a primary storage (which can be a semiconductor memory) 116 through a PCI bus. Next, the transfer unit 162 reads out, via the selector 161, a predetermined amount of image data from the frame memory 135b, and passes the image data to the PCI transfer controller 152. The PCI transfer controller 152 transfers the image data to the primary storage 116 through the PCI bus. Thus, the transfer unit 162 first transfers the image data from the frame memory 135a to the PCI transfer controller 152 and then repeats the processing for transferring the image data from the frame memories 135a and 135b to the PCI transfer controller 152 alternately.

Thus, in the conventional technique, the image data from the frame memory 135a is transferred first to the PCI transfer controller 152. Therefore, although the image data from the frame memory 135b is ready for transfer, if the image data from the frame memory 135a is not ready for transfer, transfer of the image data is not stated. In other words, although the PCI transfer controller can process transfer requests from plural request sources in parallel, the function is not fully utilized.

Thus, in the conventional techniques, most of the functions (parallel reading, reading speed, output speed, etc.) of the image input/output units are not fully used.

For example, when image reading units, which are capable of reading image data on both sides of an original in parallel, transfer the image data on the front and the back sides to a secondary storage side, the image reading units often transfer the image data read from the front and the back sides to the secondary storage sequentially for each side. This is because, although processing of image data is improved compared with that in the past, depending on a combination of image input/output units that execute processing for transferring image data to, storing image data in, and readout image data from the secondary storage side simultaneously, it is difficult to process plural image data in parallel because of a problem of speed.

However, taking into account freedom of structure, extension, and the like of an image information apparatus, a data transfer unit like a universal serial bus (USB) or a PCI is often used for a data transfer (transmission and reception) unit for inputting and outputting image data to and from the secondary storage side such that transfer of plural data can be executed by an identical transfer unit (e.g., the PCI transfer controller described above) simultaneously (in parallel). Under such circumstances, it is inevitable to transfer plural image data between the image information apparatus and the secondary storage in parallel.

SUMMARY OF THE INVENTION

It is an object of the present invention to at least solve the problems in the conventional technology.

An image information apparatus according to an aspect of the present invention includes an least two image reading units, the image reading units read, in parallel, images on corresponding sides of a double-sided original and acquire image data of the corresponding sides; a primary storage unit that temporarily stores the image data of one or both the sides that is acquired by the image reading units; a secondary storage unit that receives the image data that is stored in the primary storage unit from the primary storage unit and stores the image data received; at least two transfer control units, each transfer control unit corresponds to an image reading unit, wherein the transfer control units transmit, in parallel and individually, the image data acquired by the corresponding image reading units to the primary storage unit via a communication path; and a communication control unit that controls transmission of data in the communication path from the transfer control units.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 11 is an example of a flowchart of the operations performed by the digital multifunction product shown in FIG. 10A;

FIG. 12 is another example of a flowchart of the operations performed by the digital multifunction product shown in FIG. 10A;

DETAILED DESCRIPTION

Exemplary embodiments of the present invention are explained in detail below with reference to the accompanying drawings. Note that components and types, combinations, shapes, and relative positions of the components described in these embodiments are not meant to limit a scope of this explanation only to the types, combinations, shapes, and relative positions of the components unless specifically described otherwise and are simple explanatory examples.

Figure 1:
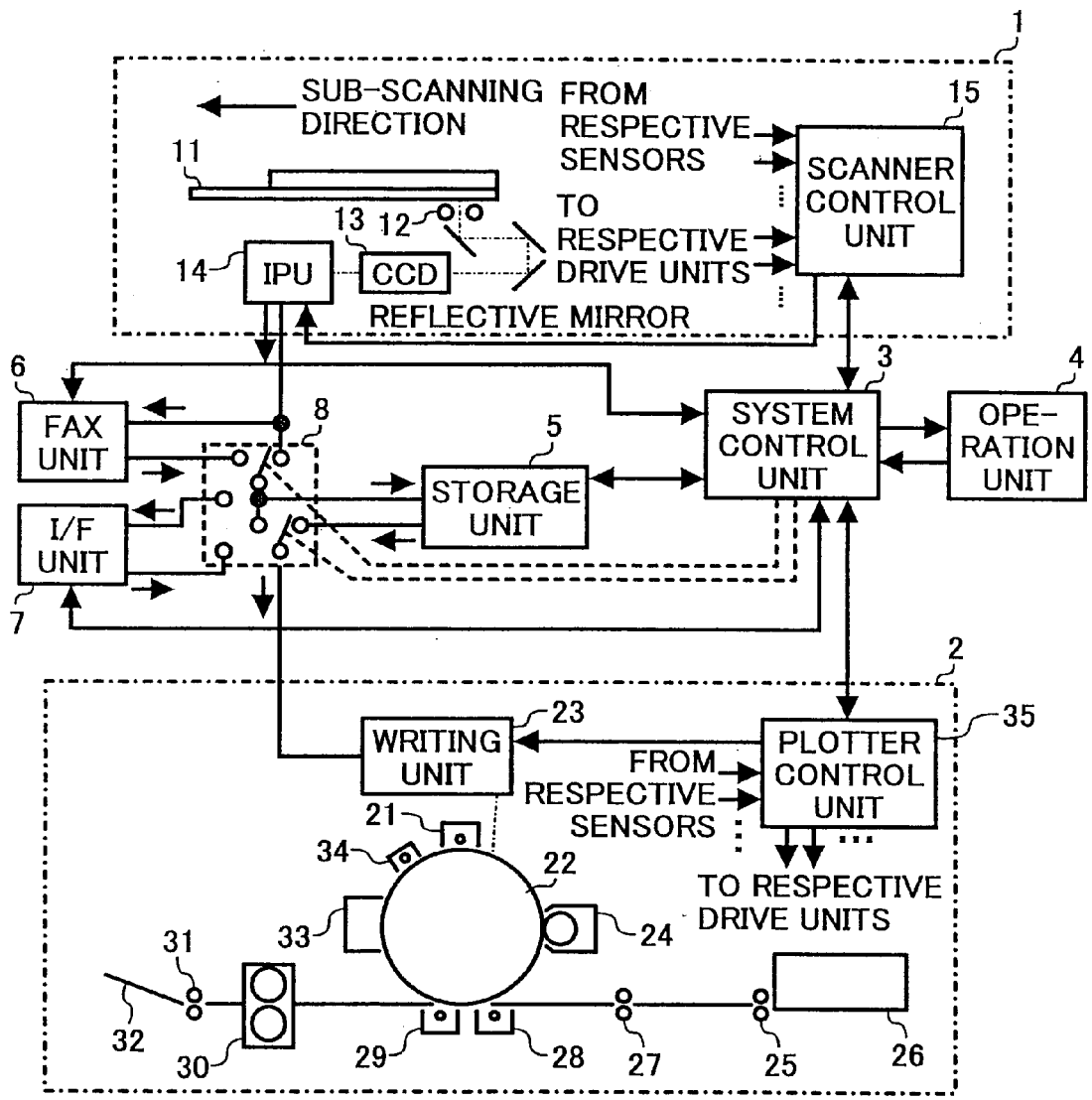
FIG. 1 is a schematic of a digital copying machine according to a first embodiment of the present invention.

FIG. 1 is a schematic of a digital copying machine according to a first embodiment of the present invention. The digital copying machine is only an example of the image information apparatuses, and the present invention is not limited to digital copying machines.

As shown in FIG. 1, the digital copying machine includes a reading unit that includes an original stand 11 for placing an original, an exposing lamp 12 that can move along the original stand 11. The reading unit 1 optically scans a surface of an original, which is set on the original stand 11, while the exposing lamp 12 exposes the surface of the original. Precisely, the reading unit 1 detects light reflected from of the surface of the original with a CCD (image sensor) 13 and performs photoelectric conversion to obtain an electric signal corresponding to the detected light. The reading unit 1 includes an imaging processing unit (IPU) 14 that applies various processings, such as shading correction, to the electric signal, subjects the electric signal to A/D conversion to obtain digital data of 8 bits, applies various image processings, such as magnification processing and dither processing, to the digital data to obtain image data, and sends the image data to an image forming unit 2 together with an image synchronization signal.

Figure 2:
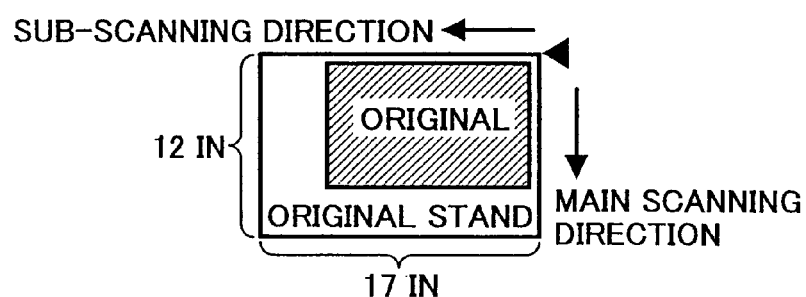
FIG. 2 is a top view of an original stand of the digital copying machine shown in FIG. 1.

FIG. 2 is a top view of the original stand 11. The original stand 11 is, for example, 12-inch wide in a main scanning direction and 17-inch long in a sub-scanning direction.

The reading unit 1 includes a scanner control unit 15 that detects various parameters by using various sensors to provide a control over a motor that drives the exposing lamp 12. Moreover, the scanner control unit 15 sets various parameters in the IPU 14 so that the IPU 14 can optimally perform various processings.

The image forming unit 2 includes a rotating photosensitive member 22. A charger 21 uniformly charges the photosensitive member 22. A writing unit 23 modulates a laser beam based on the image data received from reading unit 1 and exposes the charged photosensitive member 22 with the modulated laser beam. As a result, an electrostatic latent image is formed on the photosensitive member 22. A developing device 24 develops the electrostatic latent image with a toner to thereby visualize the electrostatic latent image and form a toner image.

The image forming unit 2 includes a sheet feeding tray 26, a sheet feeding roller 25, a registration roller 27, a transfer charger 28, and a separating charger 29. The sheet feeding tray 26 houses transfer sheets (paper). The sheet feeding roller 25 picks up a transfer sheet from the sheet feeding tray 26. The picked-up transfer sheet is conveyed to the registration roller 27 where it remains in a stand-by state. When the formation of the toner image on the photosensitive member 22 is complete, the transfer sheet that is in the stand-by state at the registration roller 27 is conveyed to the transfer charger 28. As a result, the toner image on the photosensitive member 22 is transferred to the transfer sheet. The separating charger 29 separates the transfer sheet with the toner image from the photosensitive member 22. The transfer sheet with the toner image is then conveyed to a fixing device 30. The fixing device 30 fixes the toner image on the transfer sheet by applying heat and/or pressure to the toner image. A sheet discharging roller 31 conveys the transfer sheet with the toner image fixed to a sheet discharge tray 32 to discharge the transfer sheet out of the digital copying machine.

The image forming unit 2 includes a cleaning device 33 that is in pressed contact with the photosensitive member 22 and that removes any toner remaining on the photosensitive member 22 after the toner image is transferred to the transfer sheet. Subsequently, an electric-charge removing charger 34 removes any electric charge remaining on the photosensitive member 22. A plotter control unit 35 performs detection by various sensors and control for a drive motor or the like to execute the process described above.

Figure 3:
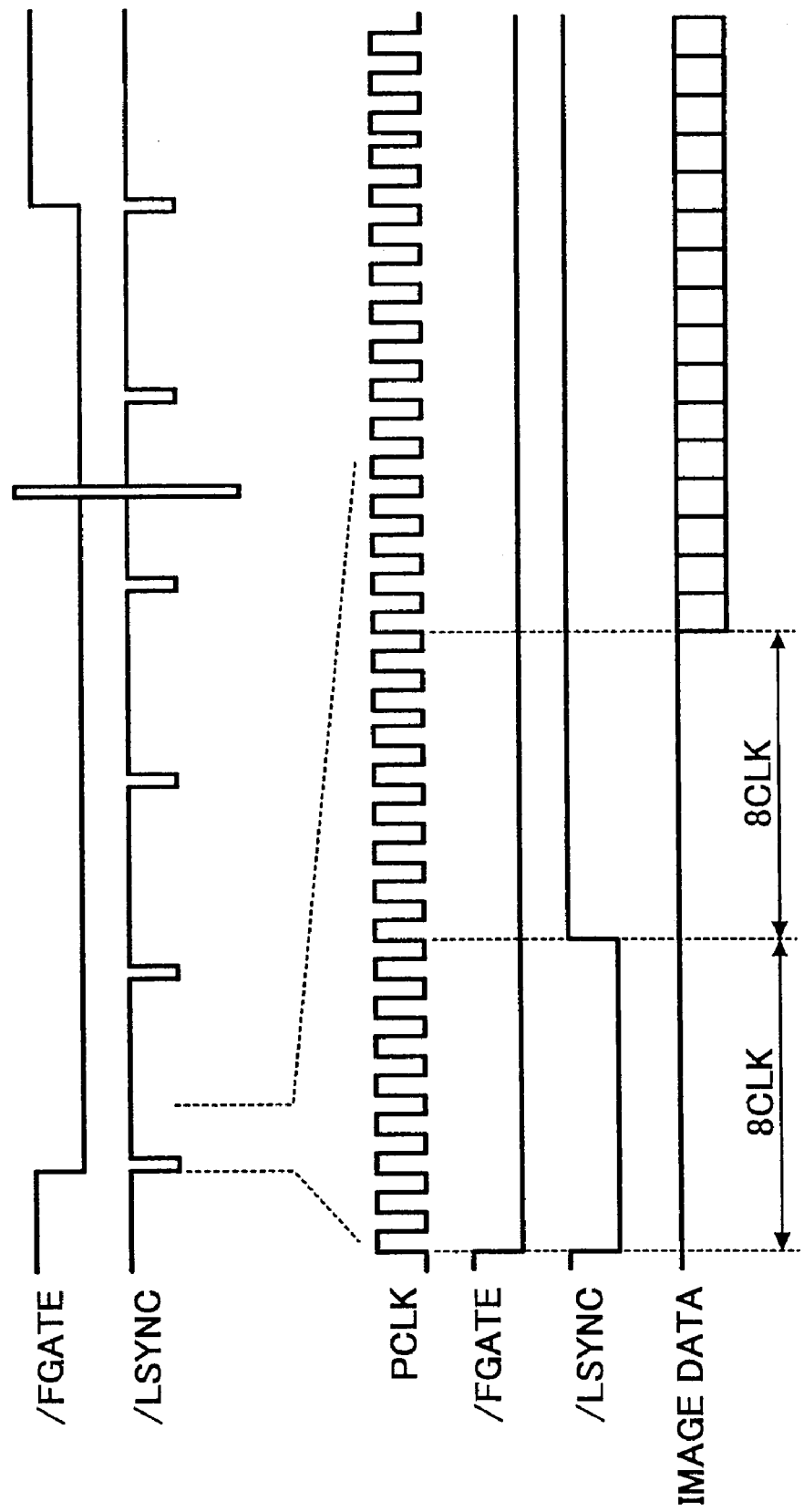
FIG. 3 is a timing chart of operations of the digital copying machine shown in FIG. 1.

FIG. 3 is a timing chart of operations of the digital copying machine shown in FIG. 1. A frame gate signal (/FGATE) is a signal that represents an image effective range for an image area in the sub-scanning direction. Image data is made effective while this signal is at a low level. The /FGATE is asserted (brought into a state in which a signal is present) or negated (brought into a state in which a signal is absent) at a rising edge of a line synchronization signal (/LSYNC).

The /LSYNC is asserted by a predetermined clock at a rising edge of a pixel synchronization signal (PCLK) and, after the rising of this signal, image data in a main scanning direction is made effective after the predetermined clock. One image data is sent for one cycle of the PCLK and is divided into the number of data equivalent to 400 DPI with a position, where a range indicated by arrows in FIG. 3 ends, as a starting point. The image data is sent as data of a luster format. A sub-scanning effective range of the image data usually depends on a size of the transfer sheet.

Returning to FIG. 1, a system control unit 3 detects a state input to an operation unit 4 by a user and, for example, sets various parameters in the reading unit 1, the image forming unit 2, a storage unit 5, a facsimile (FAX) unit 6, and an interface (I/F) unit 7 and instructs these units to execute processes. In addition, the system control unit 3 displays a state of an entire system on the operation unit 4. Note that an instruction to the system control unit 3 is made by key input to the operation unit 4 by the user.

The FAX unit 6 encodes image data passed from the system control unit 3 based on a data transfer provision of G3 or G4 facsimile communication and sends the image data to a telephone line. In addition, the FAX unit 6 restores data transferred to the FAX unit 6 from the telephone line to change the data to binary image data and sends the image data to a writing unit 23 of the image forming unit 2.

The I/F unit 7 sends data in the storage unit 5 to the outside and stores data received from the outside in the storage unit 5 according to an instruction from the system control unit 3.

A selector unit 8 changes a state of a selector according to an instruction from the system control unit 3 and selects a source of image data at the time of image formation out of the reading unit 1, the storage unit 5, the FAX unit 6, and the I/F unit 7.

Since the storage unit 5 usually stores image data of an original input from the IPU 14, the storage unit 5 is used for a copy application like remote copy or rotational copy. In addition, the storage unit 5 is also used as a buffer memory to temporarily store the binary image data from the FAX unit 6. Moreover, the storage unit 5 is also used as means for storing peculiar information that is input from an input/output device via the I/F unit 7. The system control unit 3 instructs the storage of the data.

Figure 4:
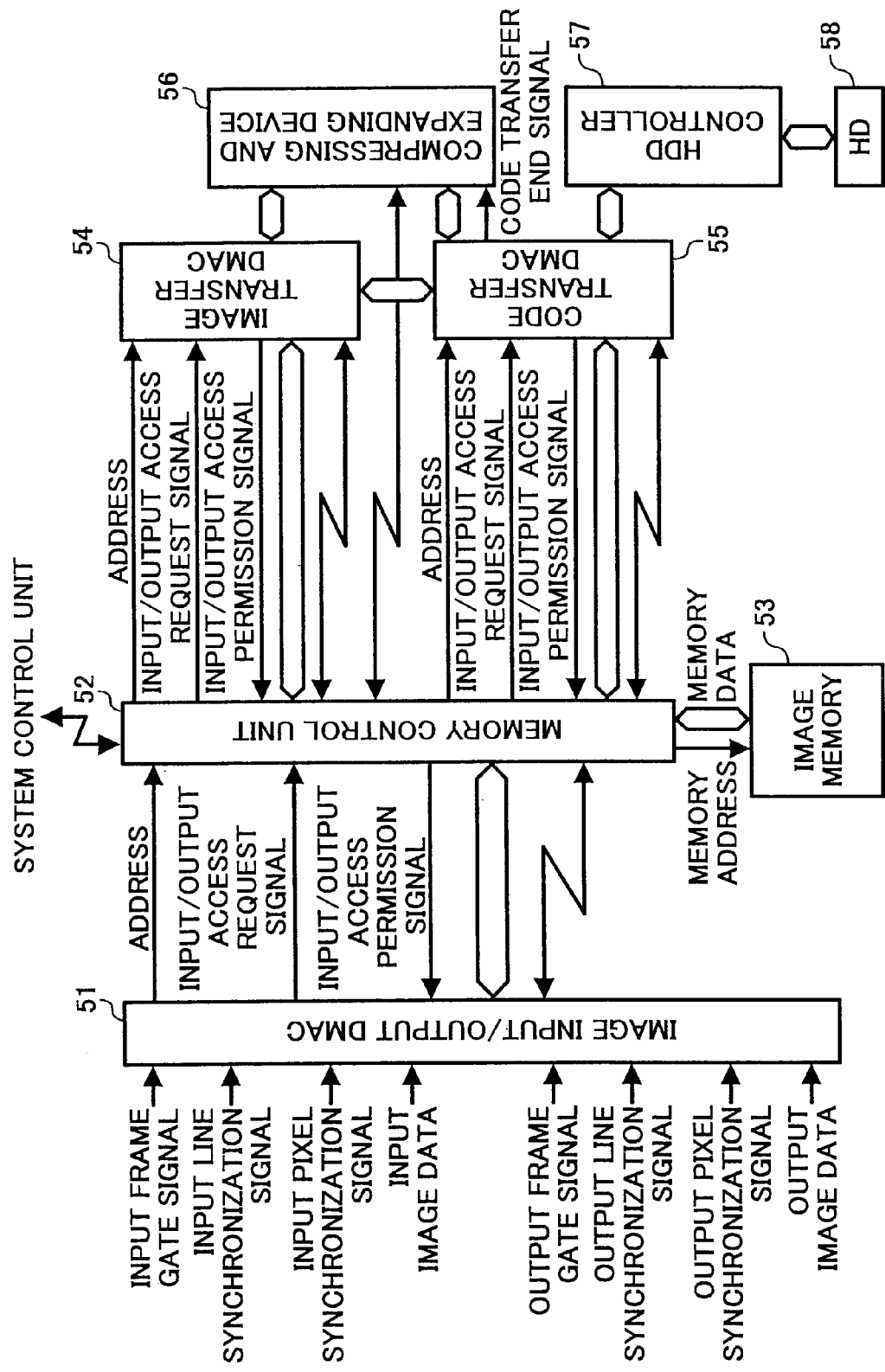
FIG. 4 is a detailed structure of a storage unit shown in FIG. 1.

FIG. 4 shows a detailed structure of the storage unit 5. The storage unit 5 includes an image input/output DMA controller (DMAC) 51 and a memory control unit 52. Although not shown, the image input/output DMAC 51 includes a CPU and a logical circuit. The image input/output DMAC 51 communicates with the memory control unit 52 to receive a command, performs operation setting corresponding to the command, and transmits a state of the image input/output DMAC 51 to the memory control unit 52 as status information. When the image input/output DMAC 51 receives a command for image input, the image input/output DMAC 51 packs input image data as memory data by a unit of eight pixels according to an input image synchronization signal and outputs the memory data to the memory control unit 52 together with a memory access signal as occasion arises. In addition, when the image input/output DMAC 51 receives a command for image output, the image input/output DMAC 51 outputs image data from the memory control unit 52 in synchronization with an output image synchronization signal.

The storage unit 5 includes an image memory 53 that stores image data. The image memory 53 can be a semiconductor storage element such as a DRAM. A total storage capacity of the image memory 53 is 16 megabytes consisting of 4 megabytes for an A3 size of 400 DPI binary image data, 4 megabytes as a capacity for electronic sort accumulation, 6 megabytes as a work area for data transfer, and 2 megabytes as an image data management area. The memory control unit 52 controls reading and writing of data in the image memory 53.

Although not shown, the memory control unit 52 includes a CPU and a logical circuit. The memory control unit 52 receives commands from the system control unit 3, performs operation setting corresponding to the commands, and transmits a state of the storage unit 5 to the system control unit 3 as status information. The operation commands include commands for image input, image output, compression, expansion, and the like. If the command relates to image input or image output, the memory control unit 52 transmits data to the image input/output DMAC 51. If the command relates to compression, the memory control unit 52 transmits data to a compressing and expanding device 56 via an image transfer DMAC 54 or a code transfer DMAC 55.

Figure 5:
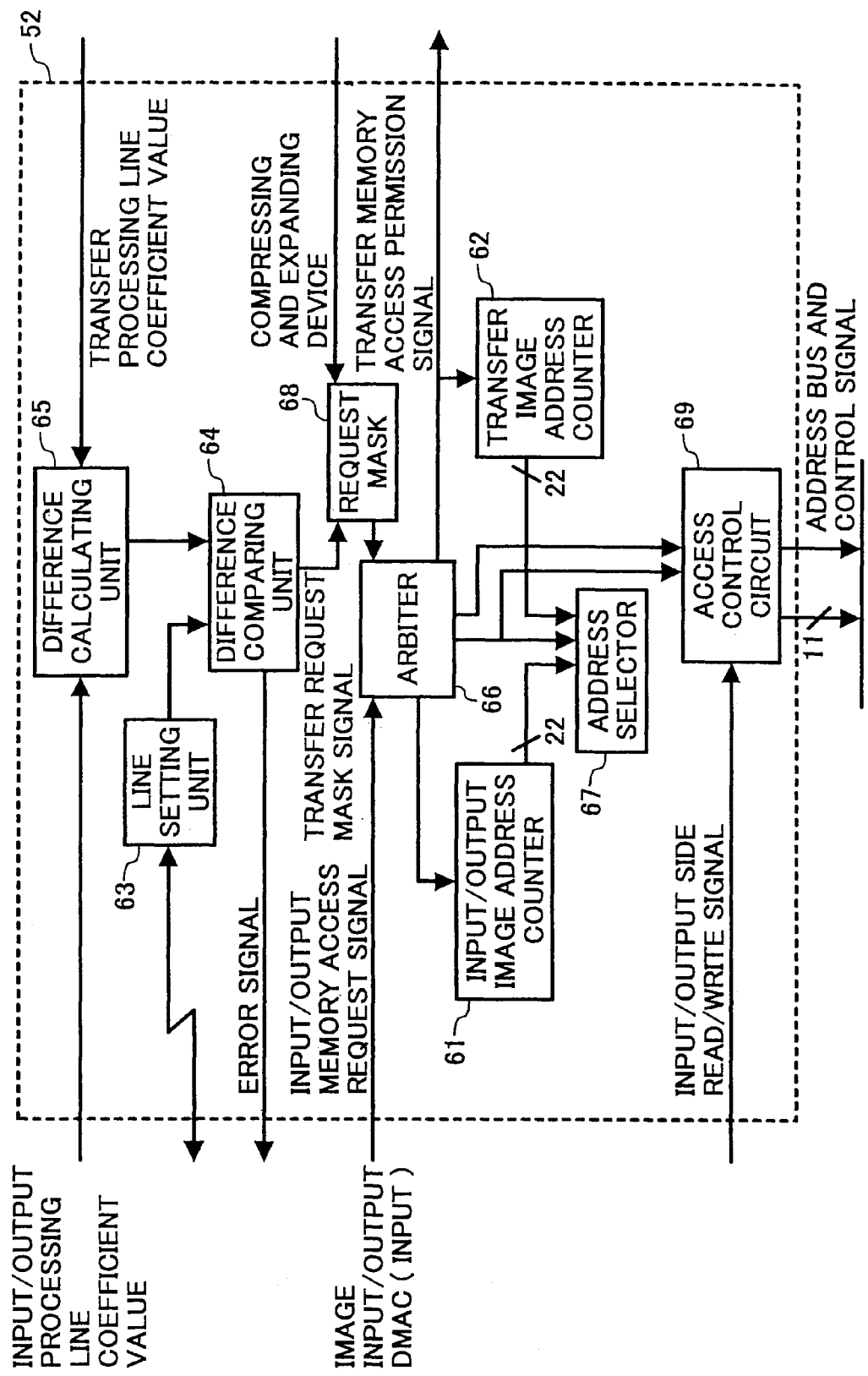
FIG. 5 is a detailed structure of a memory control unit shown in FIG. 4.

FIG. 5 is a detailed structure of the memory control unit 52. The memory control unit 52 includes an input/output image address counter 61 that counts up according to an input/output memory access request signal. The input/output image address counter 61 outputs a 22-bit memory address that indicates the location of the input/output image data. Note that the address is initialized once at the start of memory access.

The memory control unit 52 includes a transfer image address counter 62 that counts up according to a transfer memory access permission signal. The transfer image address counter 62 outputs a 22-bit memory address that indicates the location of the transfer image. Note that the address is initialized once at the start of memory access.

When a semiconductor memory is used as a buffer at the time of image input, the system control unit 3 sets a value for comparing a difference between input processing lines and transfer lines, which is outputted from a difference calculating unit 65, in a difference comparing unit 64. Note that, at the time of image input, the difference calculating unit 65 subtracts the number of input/output processing lines outputted by the image input/output DMAC 51 from the number of transfer processing lines outputted by the compressing and expanding device 56 and outputs a result of the subtraction to the difference comparing unit 64.

At the time of image input, the difference comparing unit 64 compares the number of difference lines outputted by the difference calculating unit 65 and a set value outputted by the line setting unit 63, outputs an error signal when the number of difference lines is equal to the set value. When the number of difference line is zero, the difference comparing unit 64 activates a transfer request mask signal for a comparison result signal that is outputted to an arbiter 66. Otherwise, or in a state in which an input/output image is not under operation, the difference comparing unit 64 does not output the active transfer request mask signal. The arbiter 66 outputs a memory access permission signal for access by the compressing and expanding device 56. The arbiter 66 outputs the memory access permission signal under conditions that an address comparison signal is active and an input/output memory access signal is inactive.

An address selector 67 is a selector that is selected by the arbiter 66. An address of an input image or a transfer image is selected. A request mask 68 masks (i.e., brings into a disenable state) a transfer memory access request signal for access by the compressing and expanding device 56 according to a result of comparison by the difference comparing unit 64 and stops transfer processing.

An access control circuit 69 divides an inputted physical address into a row address and a column address corresponding to an image memory (e.g., DRAM) 53 and outputs the addresses to an address bus of 11 bits. In addition, the access control circuit 69 outputs DRAM control signals (RAS, CAS, WE, etc.) according to an access start signal from the arbiter 66.

The storage unit 5 is initialized by an image input instruction from the system control unit 3 and comes into an image data pending state. When the reading unit 1 operates to input image data to the storage unit 5, the memory control unit 52 writes the image data in the image memory 53 once. In that case, the memory control unit 52 counts the number of processing lines of the written image data with the image input/output DMAC 51. At this point, the compressing and expanding device 56 outputs a transfer memory access request signal in response to a command for image transfer. However, since the request signal is masked by the request mask unit 68 in the memory control unit 52, actual memory access is not performed. Thereafter, data input for one line from the image input/output DMAC 51 ends, whereby the mask for the transfer memory access request signal is released, the image data is read out from the image memory 53, and an operation for transferring the image data to the compressing and expanding device 56 is started. During this operation, the difference calculating unit 65 calculates a difference between the numbers of the two processing lines and, if the difference is zero, the request mask unit 68 masks the transfer memory access request signal such that overtaking of an address does not occur.

The image transfer DMAC 54 includes a CPU and a logical circuit. The image transfer DMAC 54 communicates with the memory control unit 52 to receive a command, performs operation setting corresponding to the command, and transmits status information for informing the memory control unit 52 of a state of the image transfer DMAC 54. When the image transfer DMAC 54 receives a command for compression, the image transfer DMAC 54 outputs a memory access request signal to the memory control unit 52. When a memory access permission signal is active, the image transfer DMAC 54 receives image data and transfers the image data to the compressing and expanding device 56. The image transfer DMAC 54 incorporates an address counter, which counts up according to the memory access request signal, and outputs a memory address of 22 bits indicating a storage place where the image data is stored.

The code transfer DMAC 55 includes a CPU and a logical circuit. The code transfer DMAC 55 communicates with the memory control unit 52 to receive a command, performs operation setting corresponding to the command, and transmits status signal for informing the memory control unit 52 of a state of the code transfer DMAC 55. When the code transfer DMAC 55 receives a command for expansion, the code transfer DMAC 55 outputs a memory access request signal to the memory control unit 52. When a memory access permission signal is active, the code transfer DMAC 55 receives image data and transfers the image data to the compressing and expanding device 56. The code transfer DMAC 55 incorporates an address counter, which counts up according to the memory access request signal, and outputs a memory address of 22 bits indicating a storage place where the image data is stored.

The compressing and expanding device 56 includes a CPU and a logical circuit. The compressing and expanding device 56 communicates with the memory control unit 52 to receive a command, performs operation setting corresponding to the command, and transmits status information for informing the memory control unit 52 of a state of the compressing and expanding device 56. In addition, the compressing and expanding device 56 processes binary data with an MH encoding method.

An HDD controller 57 includes a CPU and a logical circuit. The HDD controller 57 communicates with the memory control unit 52 to receive a command and performs operation setting corresponding to the command. In addition, the HDD controller 57 transmits status information for informing the memory control unit 52 of a state of a hard disk storage (HDD) 58 serving as a secondary storage, obtains a status from the HDD 58, and performs data transfer with the HDD 58.

As an operation of the entire storage unit 5, in the case of image input and data accumulation, the image input/output DMAC 51 writes image data in a predetermined image area of the image memory 53. On the other hand, the image input/output DMAC 51 reads out the image data from the image memory 53. At this point, the image transfer DMAC 54 counts the number of image lines.

In the first embodiment, for example, image reading units described in claims are realized by the image reading units 1, a primary storage unit described in claims is realized by the image memory 53, a secondary storage unit described in claims is realized by the HDD 58, and transfer control units described in claims is realized by the memory control unit 52, the image transfer DMAC 54, the code transfer DMAC 55, and the like.

When an image is read, read one image data is stored entirely or partially in the image memory 53. The image transfer DMAC 54 transfers the image data to the compressing and expanding device 56. The compressing and expanding device 56 compresses the image data according to MH encoding and the code transfer DMAC 55 transfers the encoded image data to the HDD 58.

Figure 6:
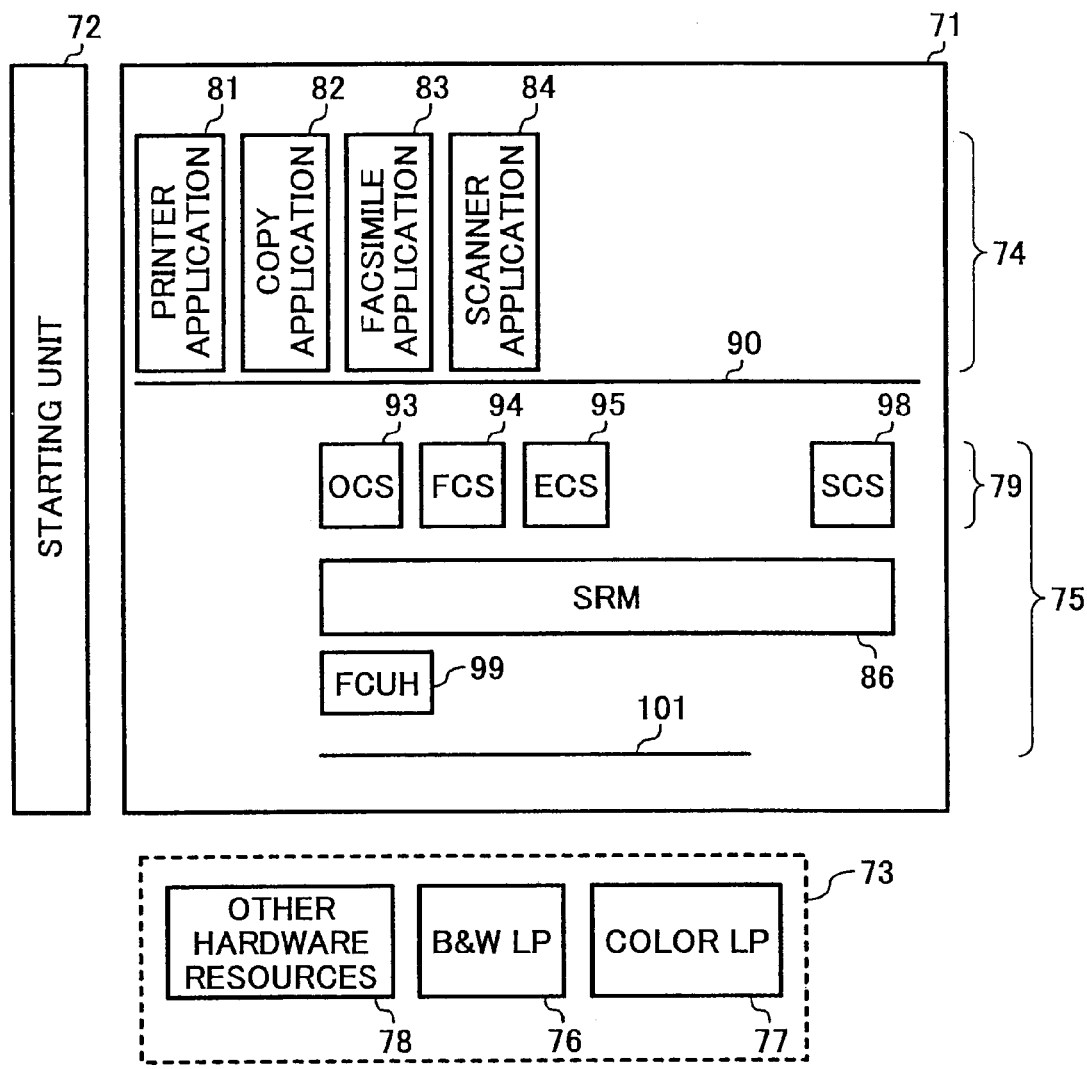
FIG. 6 is a software diagram of a digital copying machine according to a second embodiment of the present invention.

FIG. 6 is a software diagram of a digital multifunction product according to a second embodiment of the present invention. Note that, here, an image information apparatus, in which functions of apparatuses like a printer, a copying machine, a facsimile apparatus, and a scanner are housed in one housing, is referred to as a digital multifunction product (hereinafter, "multifunction product").

This multifunction product includes a program (software) group 71 consisting of an application program group 74 and a platform program group 75, a starting unit 72, and hardware resources 73. When power is supplied to the multifunction product, the starting unit 72 operates first to start the application program group 74 and the platform program group 75. For example, the starting unit 72 reads out the application program group 74 and the platform program 75 from a hard disk storage (HDD) or the like serving as the secondary storage unit, transfers the read-out computer programs to a memory area, and starts the computer programs. The hardware resources 73 include a black and white laser printer (B&W LP) 76, a color laser printer (Color LP) 77, and other hardware resources 78 like a scanner and a facsimile apparatus. Moreover, although not shown, the hardware resources 73 include a CPU, a semiconductor memory, and various logical circuits to be described later, which are hardware resources, as an operation environment of the program group 71.

The application program group 74 includes computer programs for performing processing peculiar to user services for image reading and image formation, respectively, like a printer application 81, a copy application 82, a facsimile application 83, and a scanner application 84.

The platform program group 75 includes control service programs 79 for interpreting a processing request from the application program 74 and issuing an acquisition request for the hardware resources 73 and a system resource manager (SRM) 86 for managing one or more hardware resources 73 and arbitrating the acquisition request from the control service programs 79.

The control service programs 79 include an operation panel control service program (OCS) 93, a facsimile control service program (FCS) 94, an engine control service program (ECS) 95, and a system control service program (SCS) 98. The platform program group 75 includes an application interface (API) 90 for receiving a processing request from the application program group 74 according to a function defined in advance.

The SRM 86 and an FCUH 99 use functions defined in advance to send a processing request to the hardware resources 73 via an engine I/F 101.

In this multifunction product, it is possible to perform processing commonly required by the respective application programs with the platform program group 75 unitarily.

Figure 7:
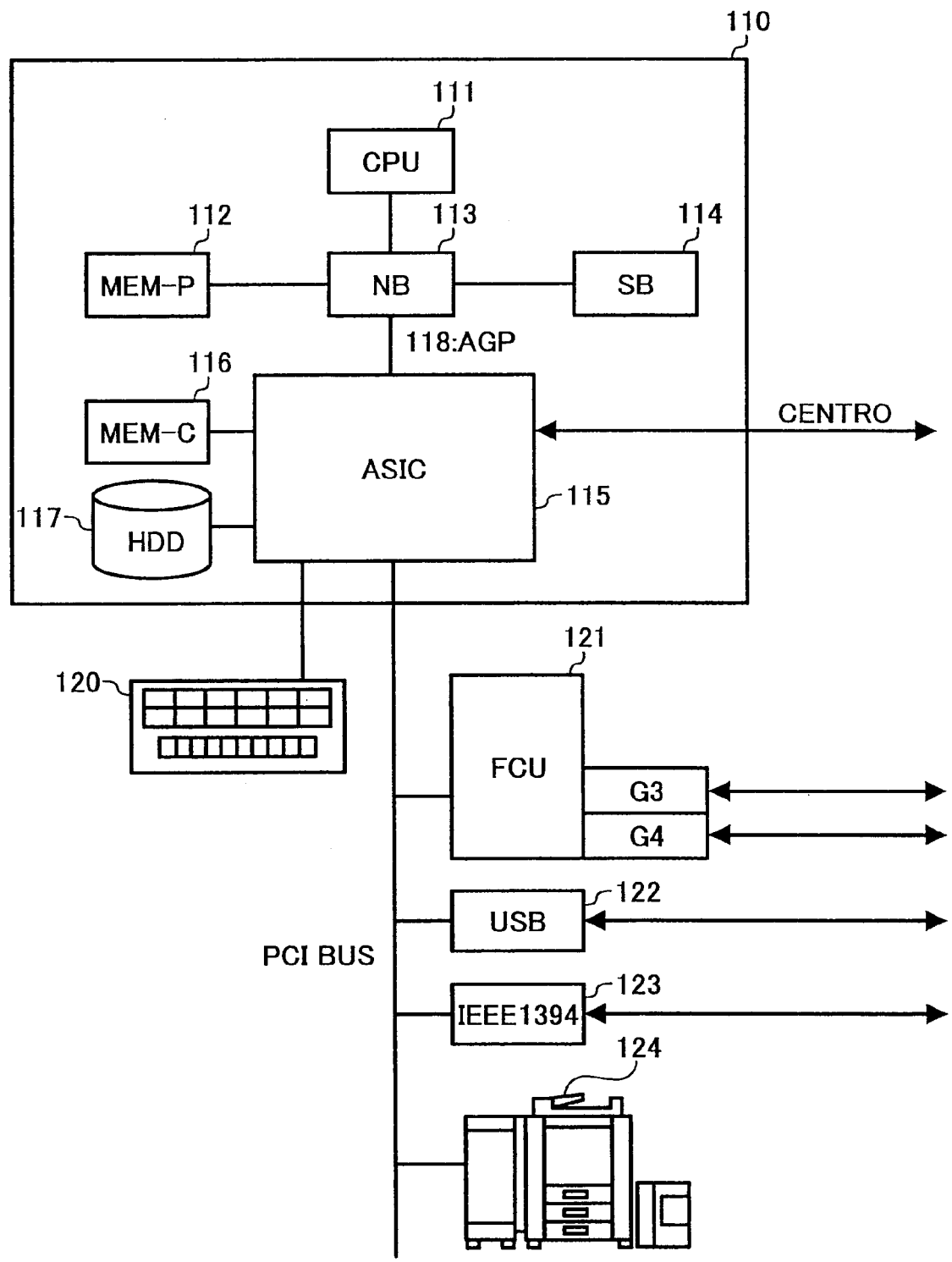
FIG. 7 is a hardware diagram of the digital copying machine according to the second embodiment.

FIG. 7 is a hardware diagram of the multifunction product according to the second embodiment. The multifunction product includes a controller 110, an operation panel 120, an FCU 121, a USB device 122, an IEEE1394 device 123, and an engine unit 124. The controller 110 includes a CPU 111, a system memory (MEM-P) 112, a north bridge (NB) 113, a south bridge (SB) 114, and an application specific integrated circuit (ASIC) 115, a local memory (MEM-C) 116 serving as a primary storage unit, and an HDD 117 serving as a secondary storage unit. The operation panel 120 is connected to the ASIC 115 in the controller 110. The FCU 121, the USB device 122, the IEEE1394 device 123, the engine unit 124 serving as an image input/output unit, and the like are connected to the ASIC 115 via a PCI bus.

In the controller 110, the local memory 116 and the HDD 117 are connected to the ASIC 115, and the CPU 111 and the ASIC 115 are connected via the NB 113. If the CPU 111 and the ASIC 115 are connected via the NB 113 in this way, it is possible to cope with a case in which an interface of the CPU 111 is not made public. Note that the ASIC 115 and the NB 113 are connected via an accelerated graphics port (AGP) 118 instead of the PCI bus. The ASIC 115 and the NB 113 are connected via the AGP 118 instead of the low-speed PCI bus in this way, whereby decline in performance is prevented when one or more processes (computer programs) constituting the application program group 74 and the platform program group 75 shown in FIG. 6 are controlled to be executed.

The CPU 111 controls the entire multifunction product. The CPU 111 starts and executes the SRM 86, the OCS 93, the FCS 94, the ECS 95, an MCS 96, the SCS 98, the FCUH 99, and an IMH 100 shown in FIG. 6 on an OS as processes. The CPU 111 also starts and executes the printer application 81, the copy application 82, the facsimile application 83, the scanner application 84, and the like constituting the application programs 74.

The NB 113 is a bridge for connecting the CPU 111, the system memory 112, the SB 114, and the ASIC 115. The system memory 112 is a memory that is used as a memory for drawing or the like of this multifunction product. The SB 114 is a bridge for connecting the NB 113 with a ROM (not shown in the figure), the PCI bus, and peripheral devices. The local memory 116 is a memory that is used as an image buffer for copy and a code buffer.

The ASIC 115 is an integrated circuit dedicated for an image processing application that has a hardware element for image processing. The HDD 117 is a secondary storage for storing image data, document data, computer programs, font data, forms, and the like. The operation panel 120 is an operation unit that receives input operation from a user and performs display for the user. The ASIC 115 has a DMA transfer function for transferring image data and performs DMA transfer with the engine unit 124 via the PCI bus.

Figure 8:
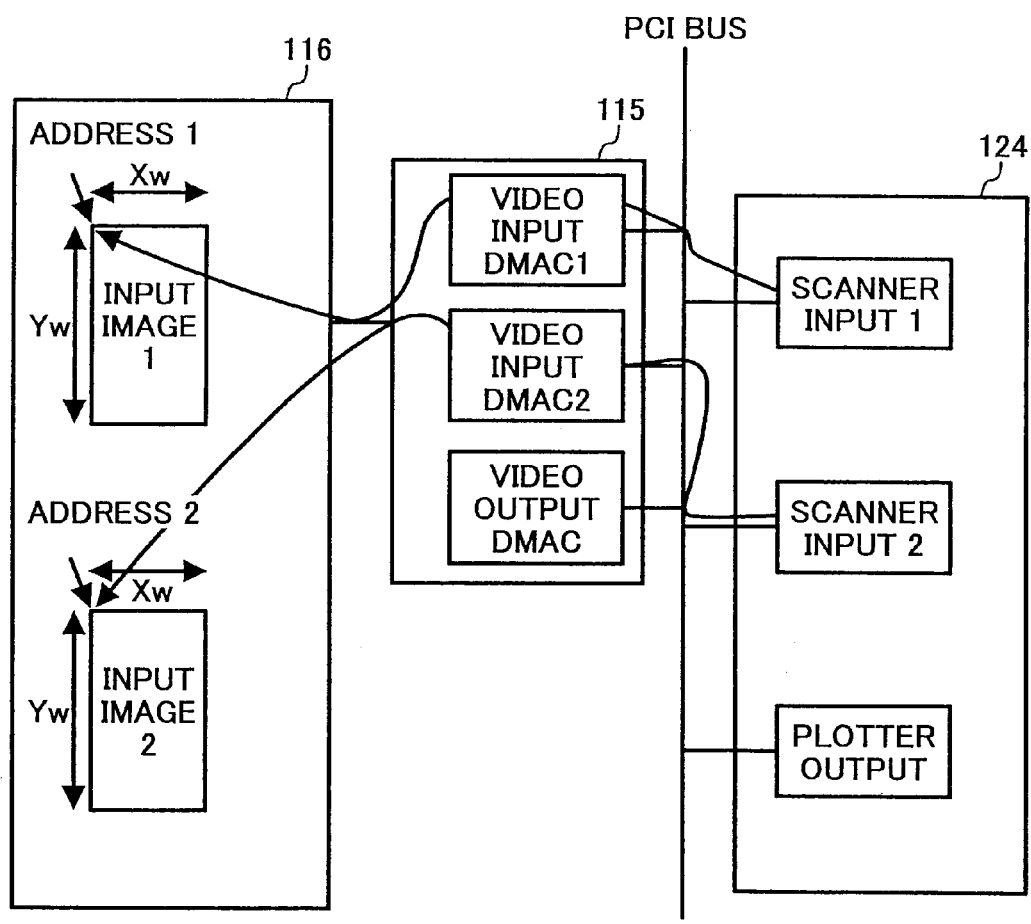
FIG. 8 is a detailed structural diagram of a local memory and a controller shown in FIG. 7.

Specifically, as shown in FIG. 8, the controller 110 includes two channels of video input DMA controllers (DMACs) and a video output DMA controller in the ASIC 115 and can perform video data transfer of a scanner input 1, a scanner input 2, and a plotter output in parallel. For example, when the controller 110 transfers image data on both sides of an original read by a scanner to the local memory 116 simultaneously (in parallel), in response to a request sent from the SRM 86, the IMH 100 secures a memory equivalent to transfer image sizes in the local memory 116 and sets transfer image sizes Xw and Yw and an address of the secured memory in the video input DMA controller in the ASIC 115 to thereby make it possible to transfer the image data.

Figure 9A:
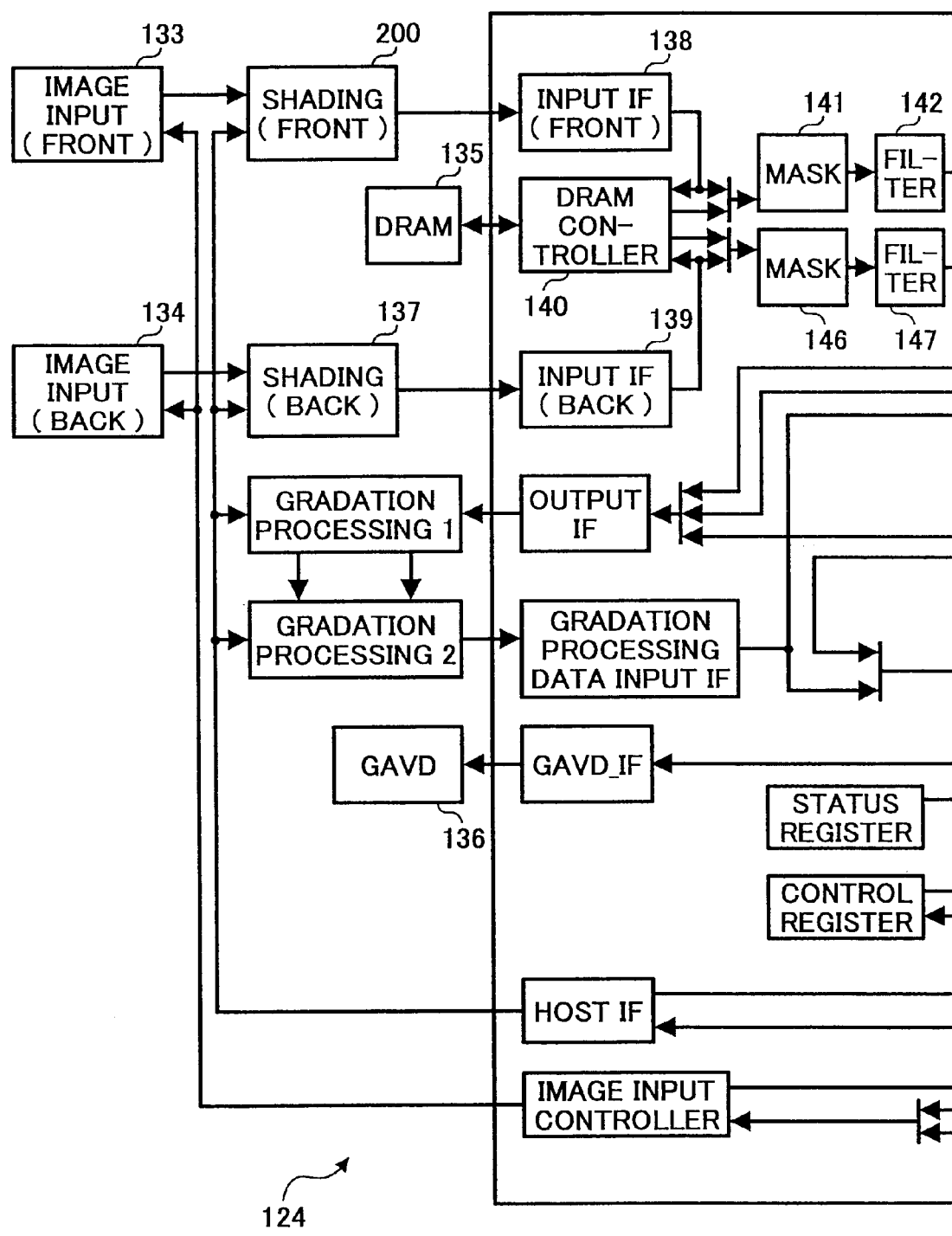
FIG. 9 is a structural block diagram of an engine unit 124 shown in FIG. 7.
Figure 9B:
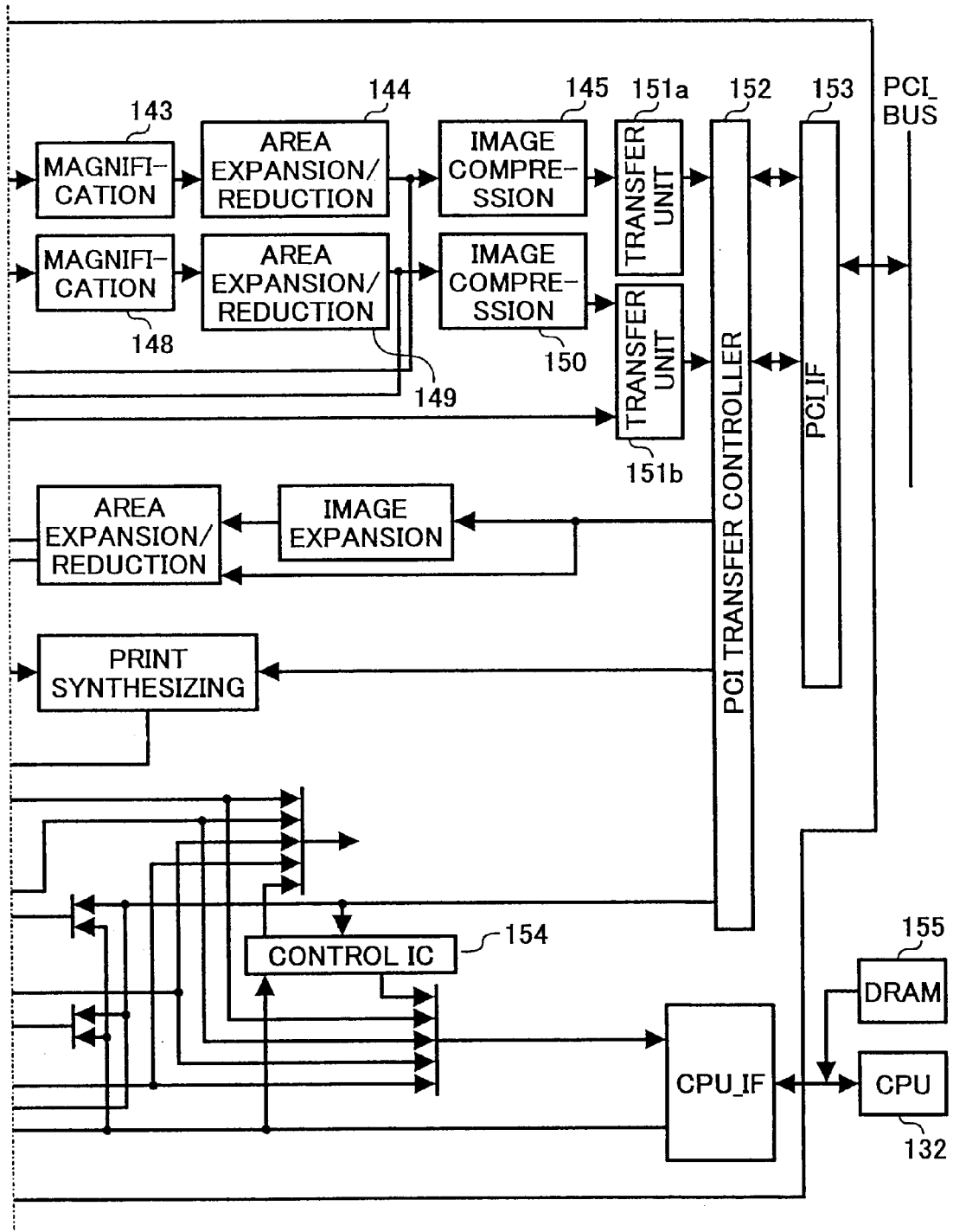

FIG. 9 is a structural block diagram of the engine unit 124 at the time when simultaneous reading of front and back sides of a double-sided original is realized.

In the engine unit 124, an image data control IF controller (hereinafter, "controller") 131 is directly controlled by a CPU 132. The controller 131 includes image input devices 133 and 134 such as CCDs, a DRAM 135 that is a frame memory for temporarily storing an input signal, and a GAVD 136 that is an output device. The controller 131 is connected to a data bus like a PCI and is capable of outputting input data to the secondary storage (an external storage, the HDD 117) side and inputting output data from the secondary storage side. Image input devices 133 and 134 are image reading elements such as CCDs and reads images from both sides of an original simultaneously (in parallel).

The frame memory 135 stores image data from the image input devices 133 and 134 temporarily. Using this frame memory 135, the controller 131 adjusts timing for inputting image data on front and back sides of an original at the time when both the sides are read simultaneously and a data transfer rate for transferring data to the PCI bus. Note that the image data on the front and the back sides are written in different continuous areas in the frame memory 135, respectively. A DRAM controller 140 performs addressing at the time of the writing. Transfer units 151a and 151b corresponding to the front and the back sides include buffer memories. The transfer units 151a and 151b capture image data on the front side or image data on the back side for each unit of transfer and pass the image data to the PCI transfer controller 152.

In the second embodiment, for example, the image reading units described in claims are realized by the engine unit 124, the primary storage unit described in claims is realized by the local memory, the secondary storage unit described in claims is realized by the HDD 117, the transfer control units described in claims is realized by the transfer unit 151, the communication control unit described in claims is realized by the PCI transfer controller 152 and the PCI interface 153, and the selecting unit described in claims is realized by the CPU 132 or the like.

Concrete examples of the second embodiment are explained below in detail.

It is assumed that, in the multifunction product according to the second embodiment, it is possible to execute writing of input image data in the frame memories 135 and readout of input image data from the frame memories 135 in parallel and, when reading of both sides is executed, it is possible to execute writing of front side image data and writing of back side image data in the frame memories 135 in parallel.

First, a data flow at the time when images on an original are read will be explained with reference to FIG. 9. Note that an image reading operation is divided into two operations:

(1) An operation for writing image data, which are inputted by the image input devices 133 and 134, in the frame memory 135 in parallel, and (2) An operation for reading out the image data on front and back sides of an original stored in the frame memory 135 in parallel, subjecting the image data to image processing like data compression (data conversion), transferring the image data to the local memory 116 in parallel via a data bus, and storing the image data in the HDD 117.

However, depending on a structure of the multifunction product, when the multifunction product does not include a frame memory or a memory capacity of a frame memory is small, it is also possible to transfer the image data directly to the data bus without dividing the image reading operation into the two operations (1) and (2).

The operation (1) will be hereinafter explained with reading of image data on the front side as an example. First, an image signal inputted from the image input device 133 for display is inputted to an image data input IF 138 via a shading processing unit 200. Then, the image data (image signal) is transferred to the frame memory 135 via the DRAM controller 140. The DRAM controller 140 addresses the inputted image data and sequentially writes and stores the inputted image data in continuous area for front side data in the frame memory 135.

Next, the operation (2) will be explained. First, the transfer unit 151*a* transfers image data for a unit of transfer in the image data on the front side stored in the frame memory 135 to the PCI transfer controller 152 via the image data processing unit 141 to 145. Then, the PCI transfer controller 152 transfers the transferred data to the local memory 116 via the PCI data bus and saves the data in the HDD 117. Note that, as the image data processing unit, there are mask processing units 141 and 146, filter processing units 142 and 147, magnification processing units 143 and 148, area expansion/reduction processing units 144 and 149, image compression processing units 145 and 150, and the like. The PCI transfer controller 152 transfers two image data, which the respective transfer units 151 requests to transfer, to the local memory 116 through the PCI data bus. In this case, for each image data, the PCI transfer controller 152 can set a data capacity and an image data transfer rate necessary for outputting the image data to the local memory 116. In addition, the PCI transfer controller 152 performs channel setting such that a transfer destination via the PCI bus is set to, for example, a DMAC 1 or a DMAC 2 (see FIG. 8).

Figure 10A:
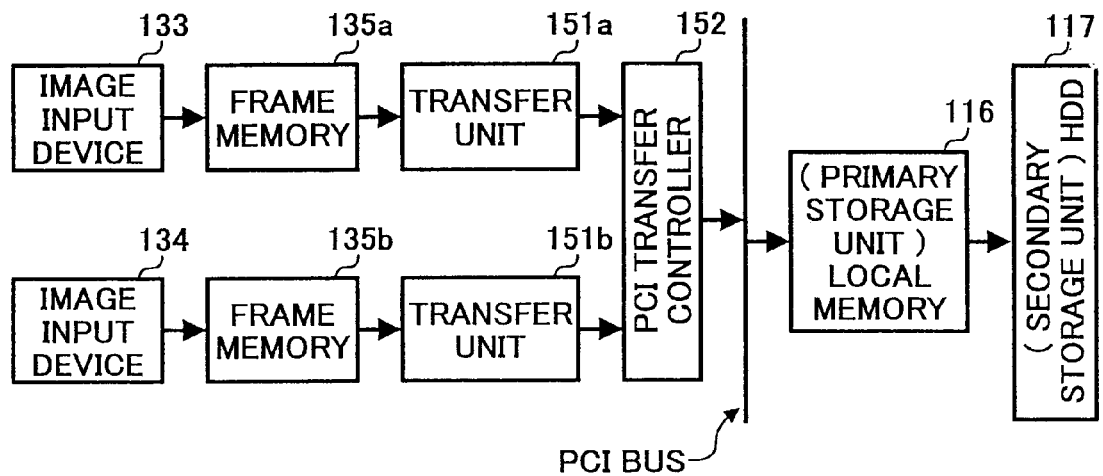
FIG. 10A is a schematic diagram of a digital multifunction product according to a first example of the present invention.
Figure 10B:
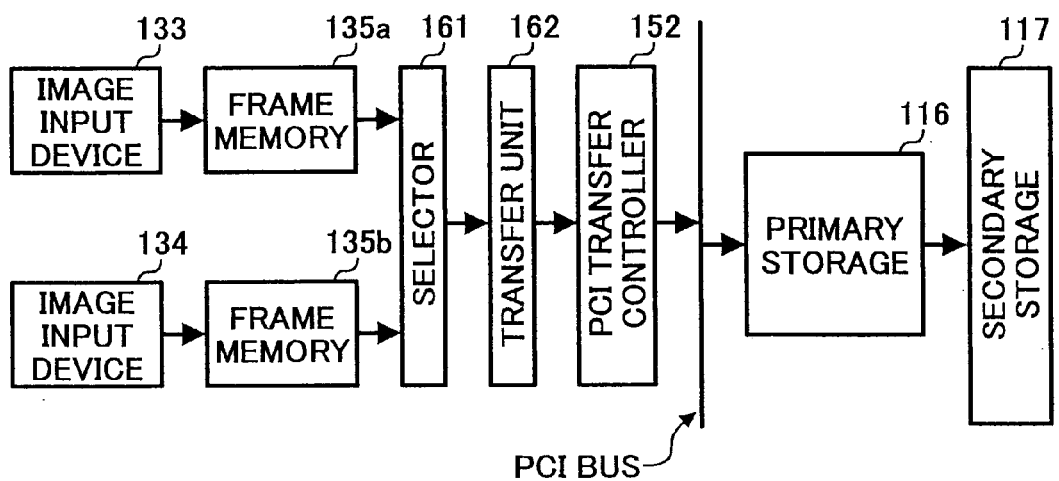
FIG. 10B is a schematic diagram of a digital multifunction product according to a conventional technique.

FIGS. 10A and 10B are structural block diagrams of a portion, which extends from the frame memories 135 to the local memory (the fist storage unit) 116 and the HDD (the second storage unit) through the PCI bus, shown as a model. FIG. 10A is a structural block diagram of the first embodiment and FIG. 10B is a structure block diagram of a conventional technique that is used for the purpose of comparison. In the structure shown in FIG. 10A, in first embodiment, a single data path (a communication path) like a PCI bus (which may be a USB) is used in a portion for executing image data transfer, and plural image data are mixed by plural channels to make it possible to transmit and receive the image data bit-serially and add a channel for data transfer relatively easily.

It is assumed that input start timing, a data capacity, a transfer rate, and the like of image data, which are inputted by the image input devices 133 and 134 such as CCDs, may be different depending on a physical arrangement of the image input devices 133 and 134. Therefore, the two transfer units 151*a* and 151*b*, which carry out transfer of image data on front and back sides of an original, are provided and data transfer processes (computer programs) for the front and the back sides to be described later are associated with the front and the back sides, respectively, such that the PCI transfer controller 152 can receive transfer requests from both the transfer units 151*a* and 151*b* in parallel. Thus, the PCI transfer controller 152 performs transfer processing for the image data asynchronously for each image data on the front and the back sides. The PCI transfer controller 152 not only transfers plural image data simultaneously and synchronously but also transfer the image data individually, asynchronously, and in parallel (in the same period). With such a structure, it is possible to change a method of transferring image data easily according to a function of reading a double-sided original, a data transfer rate, and timing for reading image data.

FIG. 11 is an example of a flowchart of the operations performed by the digital multifunction product shown in FIG. 10A. These operations relate to reading image data from an original. These operations are programmed as processes (consisting of computer programs) in the scanner application 84 and the engine unit 124. The CPU 111 sends a request to the engine unit 124 using the platform program 75 such as the SRM 86 and the ECS 95 according to the scanner application 84. The CPU 132 in the engine unit 124 continues to execute this operation flow according to the request.

First, with the operation panel 120, a user instructs the multifunction product to perform simultaneous reading of both sides, and the CPU 111 recognizes the instruction and notifies the CPU 132 in the engine unit 124 of contents of the instruction (step S1). Consequently, to read image data on front and back sides of an original in parallel, the CPU 132 starts a front side reading process (step S3) and a back side reading process (step S6) that are executed by the CPU 132 itself. The CPU 132 also starts data transfer processes (see FIG. 12) for the front and the back sides, respectively. Concretely, in the front side reading process, when the original is conveyed to a predetermined position ("Yes" in step S2), the CPU 132 starts the front side reading and the DRAM controller 140 stores the image data in the frame memory 135*a* (step S3).

When the transfer of the image data on the front side ends ("Yes" in step S4), the CPU 132 ends the front side reading process.

On the other hand, in the back side reading process, when the original is conveyed to a predetermined reading position ("Yes" in step S5), the CPU 132 starts the back side reading and the DRAM controller 140 stores the image data on the back side in the frame memory 135b in parallel with the storage of the image data on the front side (step S6).

When the transfer of the image data to the local memory 116 ends ("Yes" at step S7), the CPU 132 judges whether the data transfer for the front side has ended and, if the data transfer for the front side has ended, and checks whether next original is present (step S8). If the next original is present ("Yes" at step S8), the CPU 132 repeats the steps S1 to S8 for the next original. If no next original is present, the CPU 132 ends the process.

FIG. 12 is another example of a flowchart of the operations performed by the digital multifunction product shown in FIG. 10A. These operations relate to reading image data on respective sides and transferring the image data.

First, in the reading process, after starting the process, the CPU 132 starts reading of a front side (or a back side) of an original if the original is conveyed to a predetermined reading position (step S11), and the DRAM controller 140 stores read image data in the frame memory 135. Then, when the original is read to a reading end position of the original and the reading of the image data on the front side (or the back side) ends ("Yes" at step S12), the CPU 132 ends the reading process.

On the other hand, in the data transfer process for transferring image data on a front and a back sides of an original, after starting the process, the CPU 132 judges whether the conditions for starting the data transfer is satisfied and, if the condition is not satisfied, waits until the condition is satisfied (step S13). Note that it is assumed that the conditions for starting the data transfer are set in advance. The data transfer can be started, for example, just after the image reading process is started, or when the number of lines written in a frame memory reaches a predetermined value.

If the condition for staring the data transfer is satisfied ("Yes" at step S13), the CPU 132 starts the data transfer (step S14). Specifically, the DRAM controller 140 reads out image data on a corresponding side, which are stored in the frame memory 135, in order from the top. On the front side, the respective image data processing units 141 to 145 (on the back side, the respective image data processing units 146 to 150) apply image processing to the image data. On the front side, the transfer unit 151a (on the back side, the transfer unit 151b) sequentially captures the image data and passes the image data to the PCI transfer controller 152. Then, the PCI transfer controller 152 transfers the passed image data from the respective transfer units 151 to the local memory 116 through the PCI bus according to a transfer request using a channel, in which the DMAC 1 or the DMAC 2 is set as a destination, properly.

Thereafter, the CPU 132 continues the process until the transfer of the front side data (or the back side data) ends (step S15). When the transfer ends ("Yes" at step S15), the CPU 132 ends the front side or the back side data transfer process.

In this way, according to the first example, when a double-sided original parallel reading unit is connected as an image input unit, it is possible not only to transfer image data on both sides of an original to the local memory serving as the primary storage unit in parallel but also to transfer the image data at arbitrary timing without adjusting the timing to transfer timing of the image data on the other side.

A second embodiment relates to a structure, when image data on both sides of an original are transferred to the local memory, that makes it is possible to select whether the image data on the both sides are to be transferred in parallel or transferred in time series.

Figure 13:
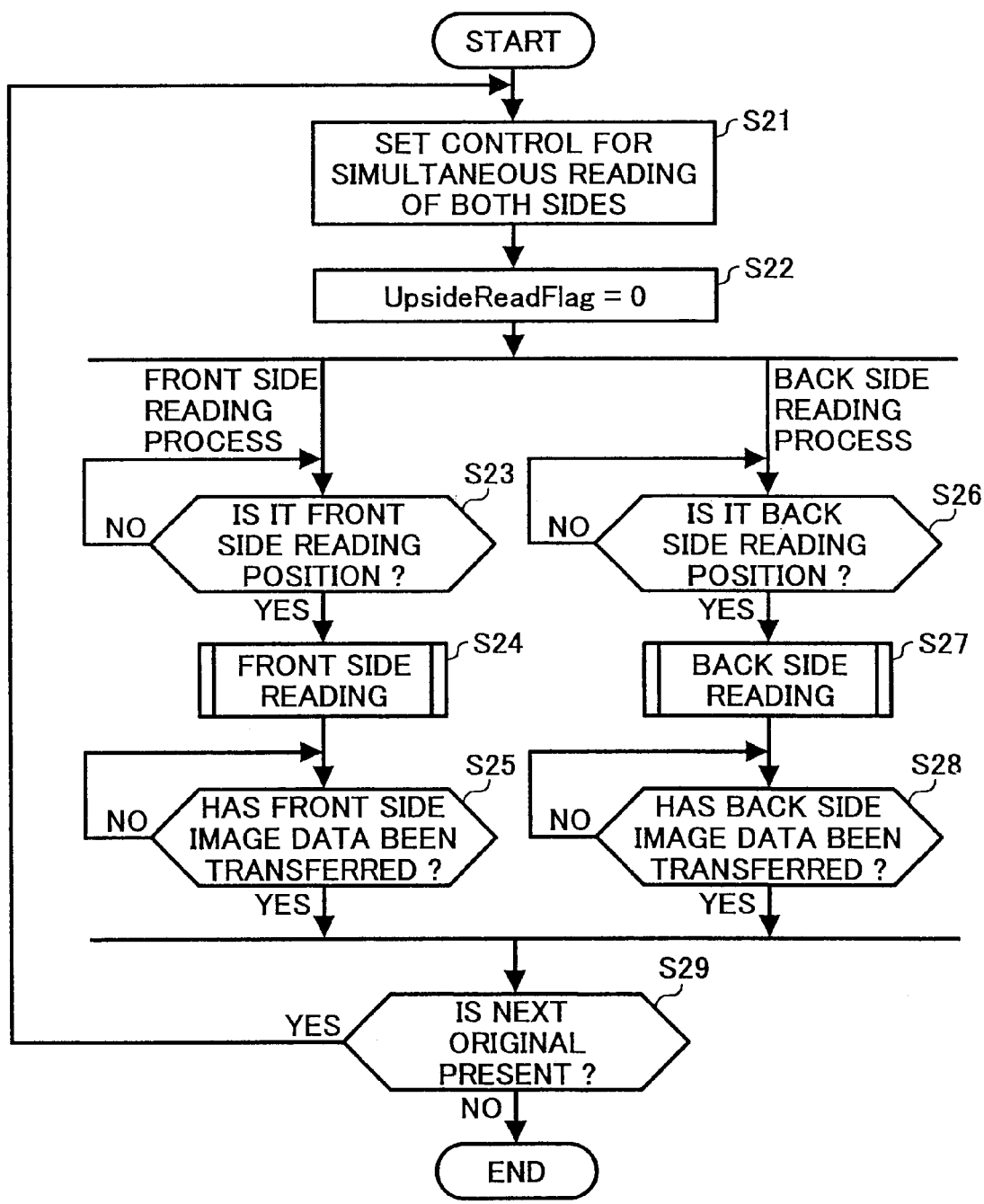
FIG. 13 is an example of a flowchart of the operations performed by a digital multifunction product according to a second example of the present invention.

FIG. 13 is an example of a flowchart of the operations performed by a digital multifunction product according to a second example of the present invention. These operations relate to reading image data from an original. These operations are programmed as processes (computer programs) in the scanner application 84 and the engine unit 124. The CPU 111 sends a request to the engine unit 124 using the platform program 75 such as the SRM 86 and the ECS 95 according to the scanner application 84. The CPU 132 in the engine unit 124 continues to execute this operation flow according to the request.

First, with the operation panel 120 a user instructs the multifunction product to perform simultaneous reading of both sides, and the CPU 111, which recognizes the instruction, notifies the CPU 132 in the engine unit 124 to that effect and also notifies the CPU 132 of a size of an unused area or the like of the local memory 116 (step S21). Consequently, the CPU 132 resets a front side reading end flag (UpsideRead-Flag) in the DRAM 155 and stores the size of the unused area of the local memory 116 in the DRAM 155 (step S22).

Subsequently, to read image data on front and back sides of an original in parallel, the CPU 132 starts a front side reading process and a back side reading process that are executed by the CPU 132 itself. The CPU 132 also starts data transfer processes for the front and the back sides shown in FIGS. 14 and 15. Then, in the front side reading process, when the original is conveyed to a predetermined position ("Yes" at step S23), the CPU 132 starts front side reading and the DRAM controller 140 stores the image data in the frame memory 135 (step S24).

When the reading of the image data on the front side and transfer of the image data on the front side to be described later end ("Yes" at step S25), the CPU 132 ends this front side reading process.

On the other hand, in the back side reading process, when the original is conveyed to a predetermined reading position ("Yes" at step S26), the CPU 132 starts back side reading and the DRAM controller 140 stores the image data on the back side in the frame memory 135 in parallel with the storage of the image data on the front side (step S27).

When the reading of the image data on the back side and transfer of the image data on the back side to the local memory 116 according to a back side data transfer process to be described later end in this way ("Yes" at step S28), the CPU 132 judges whether a front side reading end flag, which is set by the front side data transfer process, is set. If the front side reading end flag is set, the CPU 132 confirms presence of the next original (step S29). Then, if the next original is present ("Yes" at step S29), the CPU 132 executes the simultaneous reading of both sides again. If no next original is present, the CPU 132 ends the process.

Figure 14:
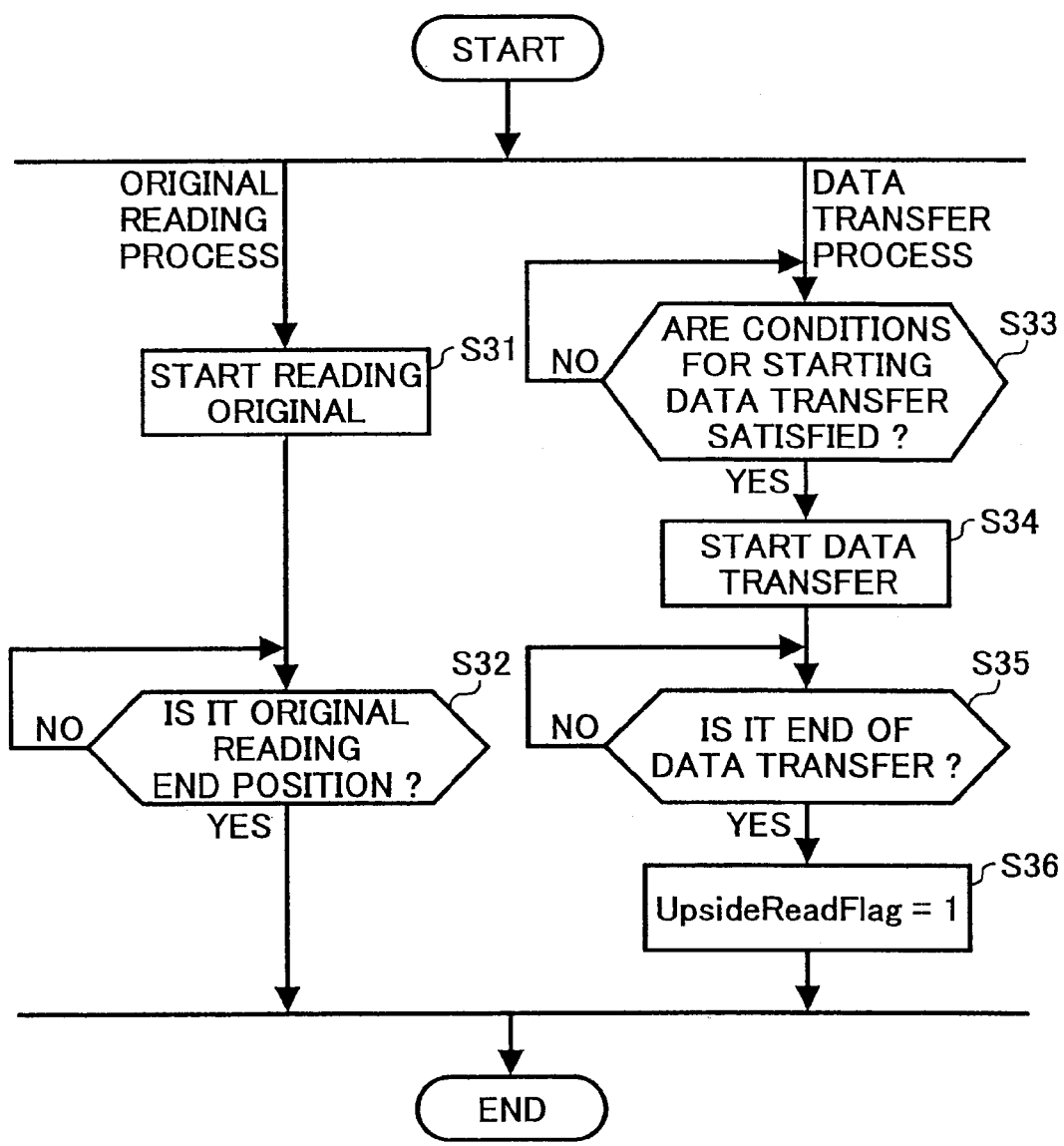
FIG. 14 is another example of a flowchart of the operations performed by the digital multifunction product according to the second example.

FIG. 14 is another example of a flowchart of the operations performed by the digital multifunction product according to the second example. These operations relate to reading image data from respective sides of the original and transferring the image data.

First, in the front side reading process, after starting the process, the CPU 132 starts front side reading when an original is conveyed to a predetermined reading position (step S31) and the DRAM controller 140 stores read image data in the frame memory 135. Then, when the original is read to a reading end position of the original and the reading of the image data on the front side ends ("Yes" at step S32), the CPU 132 ends the front side reading process.

On the other hand, in the front side data transfer process, after starting the process, the CPU 132 waits until the condition for starting the data transfer is satisfied (step S33). Note that it is assumed that the conditions for starting the data transfer are set in advance. The data transfer can be started, for example, just after the image reading process is started, or when the number of lines written in a frame memory reaches a predetermined value.

If the condition for staring the data transfer is satisfied ("Yes" at step S33), the CPU 132 starts the data transfer (step S34). More specifically, the DRAM controller 140 reads out image data on the front side, which are stored in the frame memory 135, in order from the top. The respective image data processing units 141 to 145 apply image processing to the image data. The transfer unit 151a sequentially captures the image data and passes the image data to the PCI transfer controller 152 for each unit of transfer. Then, the PCI transfer controller 152 transfers the passed image data to the local memory 116 through the PCI bus using a channel in which the DMAC 1 is set as a destination. Thereafter, the CPU 132 continues the process until the transfer of the front side data ends (step S35) and, when the transfer ends ("Yes" at step S35), sets a front side reading end flag (UpsideReadFlag) (step S36).

Figure 15:
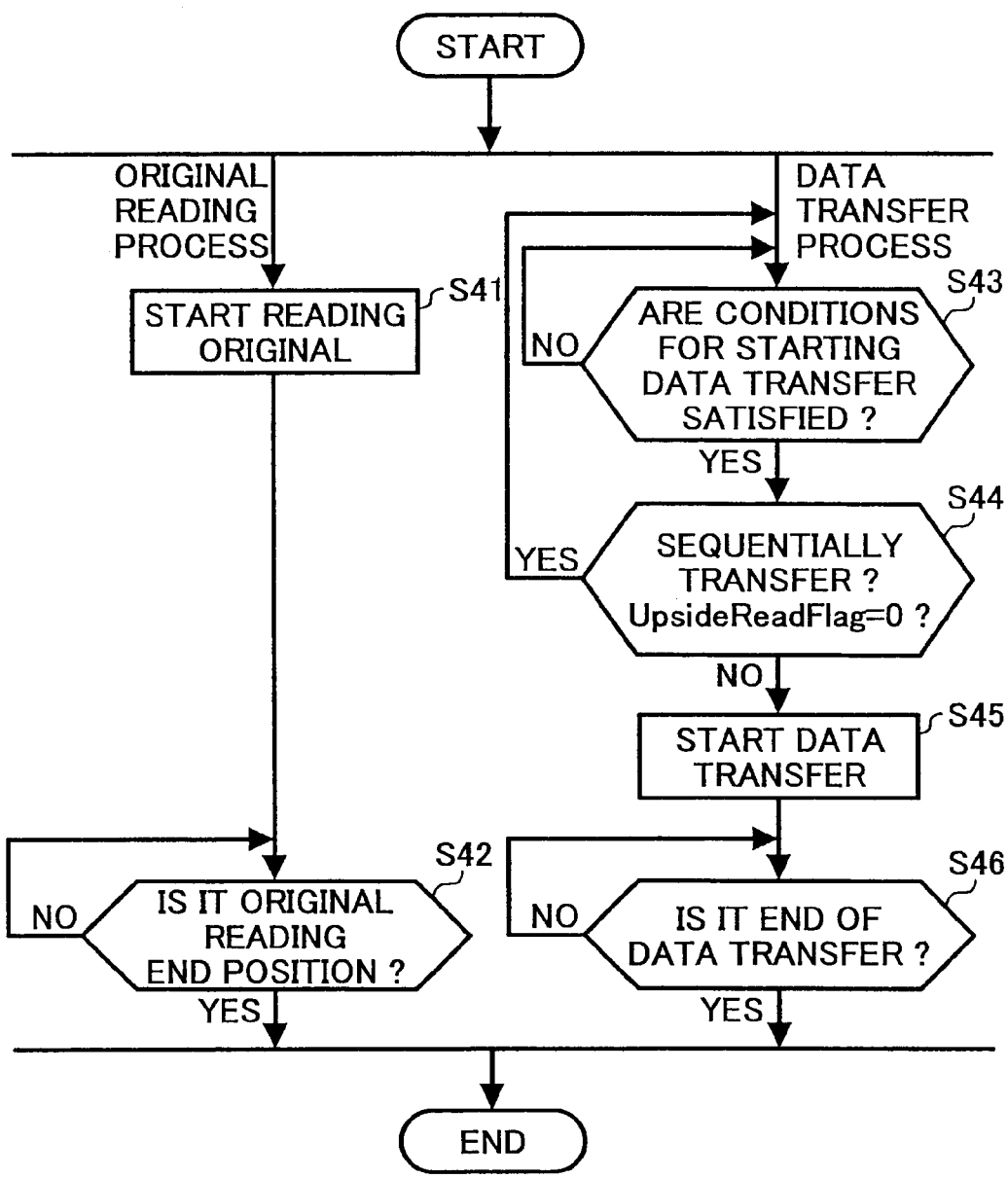
FIG. 15 is still another example of a flowchart of the operations performed by the digital multifunction product according to the second example.

Next, an outline of an operation flow of the back side reading process and an operation flow of the back side data transfer process will be explained with reference to FIG. 15.

First, in the back side reading process, after starting the process, the CPU 132 starts back side reading when an original is conveyed to a predetermined reading position (step S41) and the DRAM controller 140 stores read image data in the frame memory 135. Then, when the original is read to a reading end position of the original and the reading of the image data on the back side ends ("Yes" at step S42), the CPU 132 ends the back side reading process.

On the other hand, in the back side data transfer process, after starting the process, the CPU 132 waits until the condition for starting the data transfer is satisfied (step S43). Note that it is assumed that the conditions for starting the data transfer are set in advance. The data transfer can be started, for example, just after the image reading process is started, or when the number of lines written in a frame memory reaches a predetermined value.

If the condition for staring the data transfer is satisfied (step S43), the CPU 132 judges whether the image data are to be transferred in parallel or sequentially (step S44). For example, when a size of an unused area of the local memory 116 stored in the DRAM 155 is small and the image data overflow from the local memory 116 in a transfer destination if the image data are transferred in parallel or when there is only one unused channel in a bus, the CPU 132 judges that the image data cannot be transferred in parallel. Therefore, in such a case, the CPU 132 judges that the image data are to be transferred sequentially ("Yes" at step S44) and waits until a front side reading end flag (UpsideReadFlag) is set.

On the other hand, when the parallel transfer is possible or when the front side reading end flag is set ("No" at step S44), the CPU 132 starts data transfer (step S45). More specifically, the DRAM controller 140 reads out the image data on the back side stored in the frame memory 135 in order from the top, the respective image data processing units 146 to 150 apply image processing to the image data, and the transfer unit 151b sequentially captures the image data and passes the image data to the PCI transfer controller 152 for each unit of transfer. Then, the PCI transfer controller 152 transfers the image data to the local memory 116 through the PCI bus using a channel in which the DMAC 2 is set as a destination. Thereafter, the CPU 132 continues the process until the transfer of the back side data ends (step S46) and, when the transfer ends ("Yes" at step S46), ends the back side data transfer process.

In this way, according to second example, when image data read from both sides of an original in parallel are to be transferred to a secondary storage, it is possible to select the parallel transfer or the sequential transfer according to circumstances. As a result, it becomes possible to make the most of the functions of the image input unit, and therefore, improve efficiency of use of the image information apparatus.

A third example relates to a structure that makes it is possible to freely design a structure of the image information apparatus and the image reading units. The selection of the parallel transfer and the sequential transfer in the second embodiment is performed according to the structure of the image information apparatus.

Figure 16:
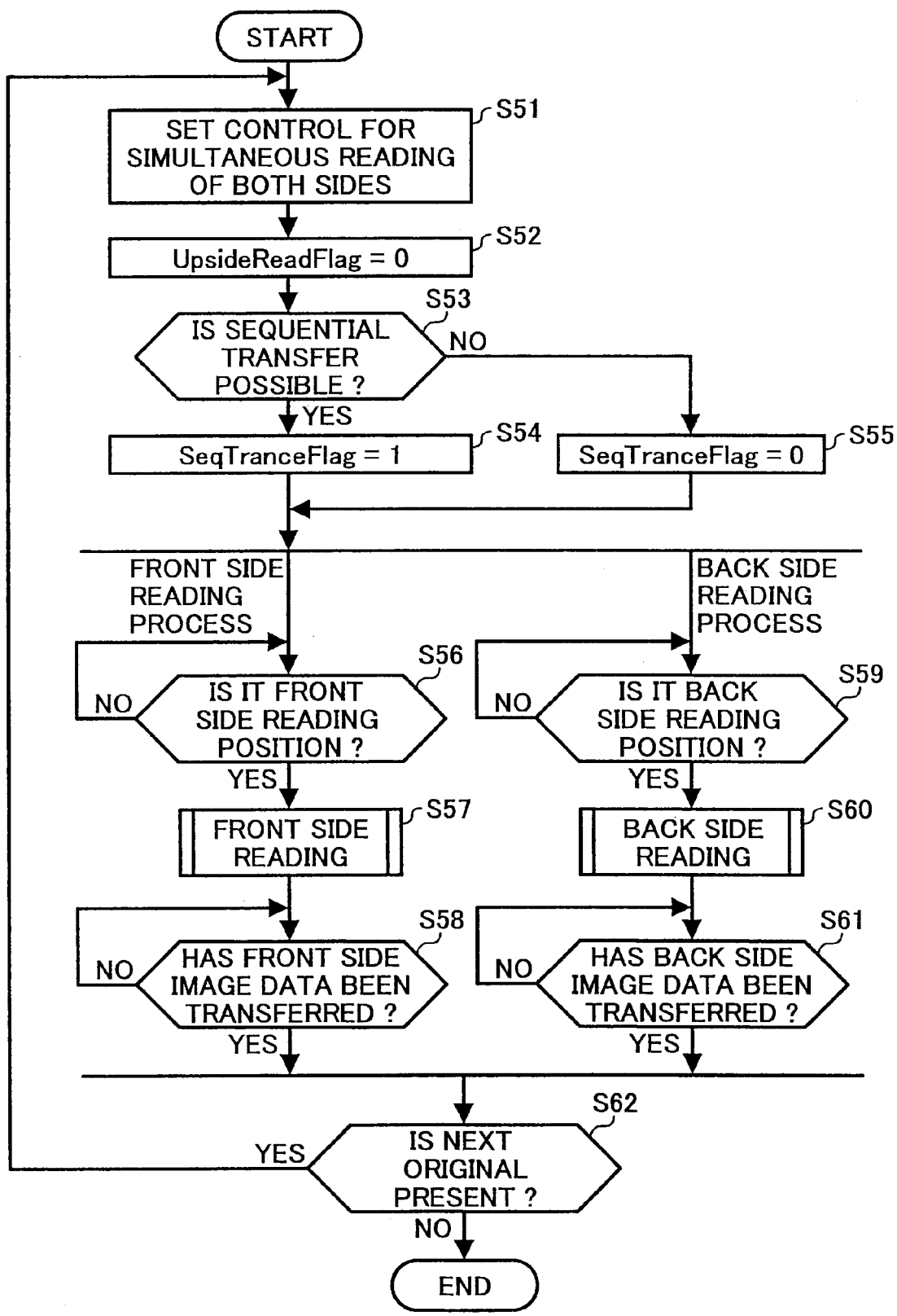
FIG. 16 is an example of a flowchart of the operations performed by a digital multifunction product according to a third example of the present invention.

FIG. 16 is an example of a flowchart of the operations performed by a digital multifunction product according to a third example of the present invention. These operations relate to reading image data from an original. These operations are programmed as processes (computer programs) in the scanner application 84 and the engine unit 124. The CPU 111 sends a request to the engine unit 124 using the platform program 75 such as the SRM 86 and the ECS 95 according to the scanner application 84. The CPU 132 in the engine unit 124 continues to execute this operation flow according to the request.

First, with the operation panel 120 a user instructs the multifunction product to perform simultaneous reading of both sides, and the CPU 111, which recognizes the instruction, notifies the CPU 132 in the engine unit 124 to that effect (step S51). Consequently, the CPU 132 resets a front side reading end flag (UpsideReadFlag) in the DRAM 155 (step S52).

Subsequently, the CPU 132 judges whether the image information apparatus has a structure in which the sequential transfer is possible (step S53). For example, when a storage capacity of the frame memory 135 is not enough for storing one page of the original, the CPU 132 judges that image data on both sides of the original cannot be transferred sequentially. Note that the CPU 132 obtains apparatus structure data for this judgment in advance and stores the apparatus structure data in the DRAM 155.

In this way, if the image information apparatus has a structure in which the sequential transfer is possible ("Yes" at step S53), the CPU 132 takes into account other conditions and selects, for example, the sequential transfer (or may select the parallel transfer depending on conditions) and sets sequential transfer flag (SeqTranceFlag) in the DRAM 155 (step S54). In addition, if the image information apparatus has a structure in which the sequential transfer is impossible ("No" at step S53), the CPU 132 selects the parallel transfer regardless of other conditions and resets the sequential transfer flag (step S55).

Next, to read image data on front and back sides of an original in parallel, the CPU 132 starts a front side reading process and a back side reading process that are executed by the CPU 132 itself. The CPU 132 also starts data transfer processes for the front and the back sides shown in FIGS. 17 and 18. Then, in the front side reading process, when the original is conveyed to a predetermined position ("Yes" at step S56), the CPU 132 starts front side reading and the DRAM controller 140 stores read image data in the frame memory 135 (step S57).

In this way, when the reading of the front side image data and transfer of the front side image data to be described later end ("Yes" at step S58), the CPU 132 ends this front side reading process.

On the other hand, in the back side reading process, when an original is conveyed to a predetermined reading position ("Yes" at step S59), the CPU 132 starts back side reading and the DRAM controller 140 stores read image data on the back side in the frame memory 135 in parallel with the storage of the front side image data (step S60).

In this way, when the reading of the back side image data and the transfer of the back side image data to the local memory 116 according to the back side data transfer end ("Yes" at step S61), the CPU 132 judges whether a front side reading end flag, which is set by the front side data transfer process, is set. If the front side reading end flag is set, the CPU 132 confirms presence of the next original (step S62). Then, if the next original is present ("Yes" at step S62), the CPU 132 executes the simultaneous reading of both sides again from step S51. If the next original is not present, the CPU 132 ends the process directly.

Figure 17:
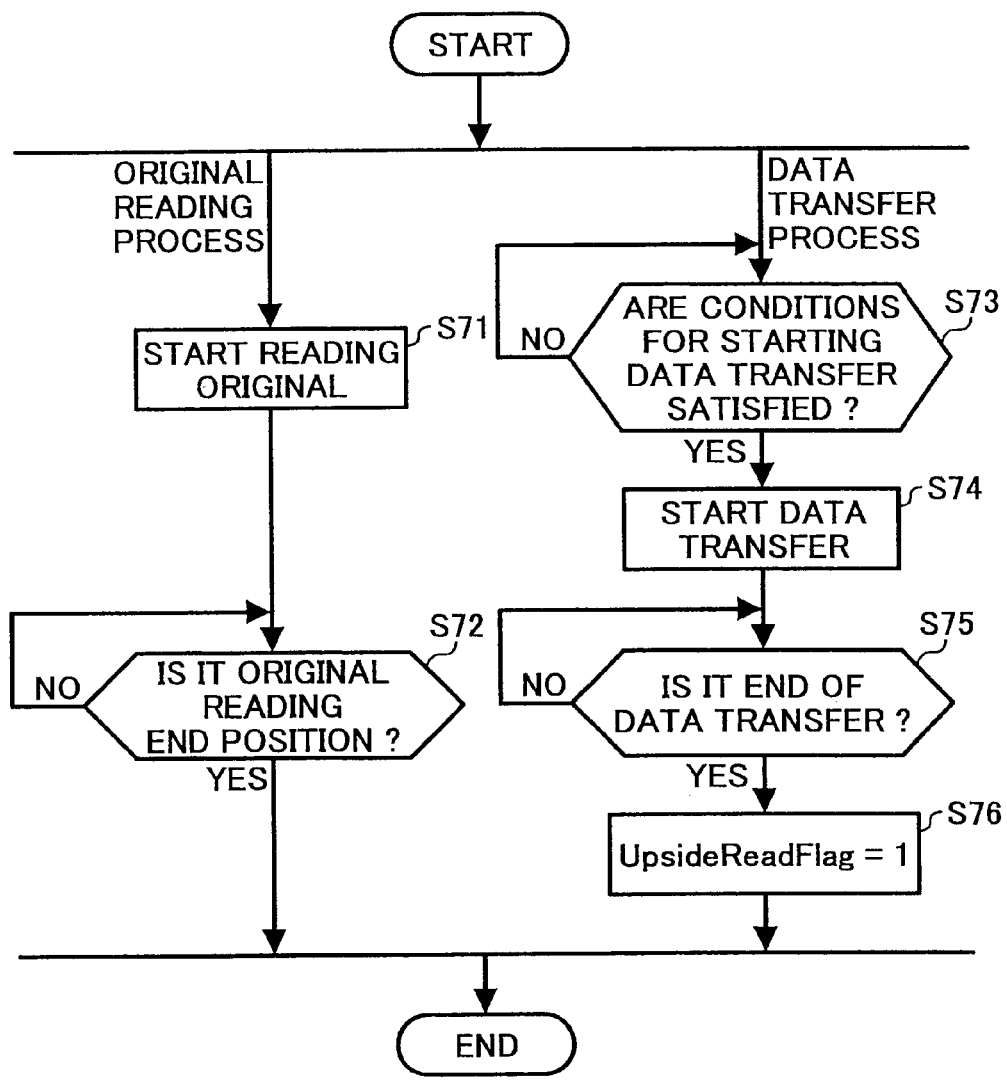
FIG. 17 is another example of a flowchart of the operations performed by the digital multifunction product according to the third example.

FIG. 17 is another example of a flowchart of the operations performed by the digital multifunction product according to the third example. These operations relate to reading image data on respective sides and transferring the image data.

First, in the front side reading process, after starting the process, the CPU 132 starts front side reading when the original is conveyed to a predetermined reading position (step S71) and the DRAM controller 140 stores read image data in the frame memory 135. Then, when the original is read to a reading end position of the original and the reading of the front side image data ends ("Yes" at step S72), the CPU 132 ends the front side reading process.

On the other hand, in the front side data transfer process, after starting the process, the CPU 132 waits until the condition for starting the data transfer is satisfied (step S73). Note that it is assumed that the conditions for starting the data transfer are set in advance. The data transfer can be started, for example, just after the image reading process is started, or when the number of lines written in a frame memory reaches a predetermined value.

If the condition for staring the data transfer is satisfied ("Yes" at step S73), the CPU 132 starts data transfer (step S74). More specifically, the DRAM controller 140 reads out image data on the front side, which are stored in the frame memory 135, in order from the top. The respective image data processing units 141 to 145 apply image processing to the image data. The transfer unit 151a sequentially captures the image data and passes the image data to the PCI transfer controller 152 for each unit of transfer. Then, the PCI transfer controller 152 transfers the image data to the local memory 116 through the PCI bus using a channel in which the DMAC 1 is set as a destination. Thereafter, the CPU 132 continues the process until the transfer of the front side data ends (step S75) and, when the transfer ends ("Yes" at step S75), sets a front side reading end flag (UpsideReadFlag) (step S76).

Figure 18:
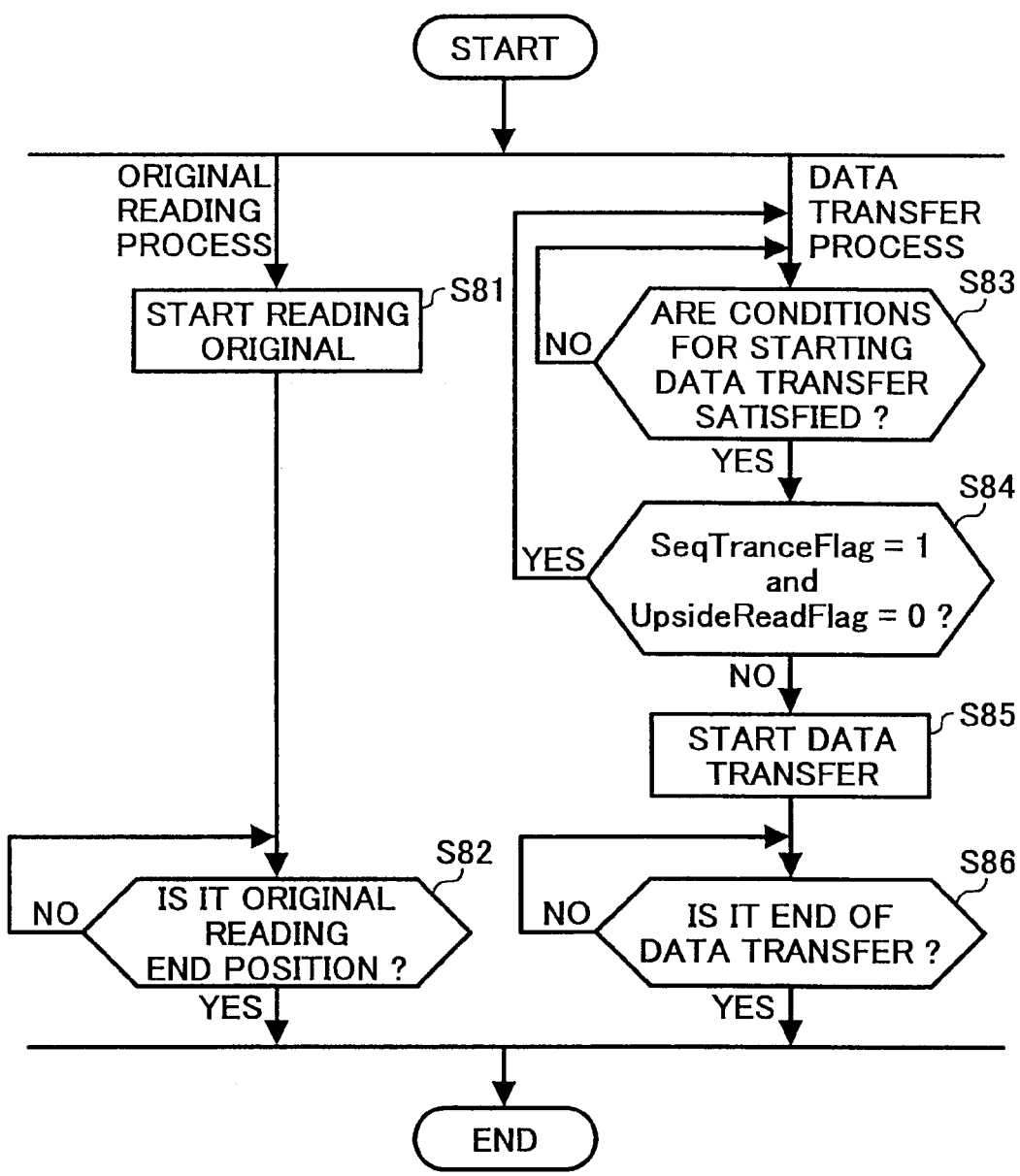
FIG. 18 is still another example of a flowchart of the operations performed by the digital multifunction product according to the third example.

Next, an outline of an operation flow of the back side reading process and an operation flow of the back side data transfer process will be explained with reference to FIG. 18.

First, in the back side reading process, as described above, after starting the process, the CPU 132 starts back side reading when an original is conveyed to a predetermined reading position (step S81) and the DRAM controller 140 stores read image data in the frame memory 135. Then, when the original is read to a reading end position of the original and the reading of the image data on the back side ends ("Yes" at step S82), the CPU 132 ends the back side reading process.

On the other hand, in the back side data transfer process, after starting the process, the CPU 132 waits until the condition for starting the data transfer is satisfied (step S83). Note that it is assumed that the conditions for starting the data transfer are set in advance. The data transfer can be started, for example, just after the image reading process is started, or when the number of lines written in a frame memory reaches a predetermined value.

If the condition for staring the data transfer is satisfied ("Yes" at step S83), the CPU 132 judges whether a sequential transfer flag (SeqTranceFlag) is set (step S84). If the sequential transfer flag is set, the CPU 132 waits until a front side reading end flag (UpsideReadFlag) is set (step S84). On the other hand, when the sequential transfer flag is not set or the front side reading end flag is set ("No" at step S84), the CPU 132 starts data transfer (step S85). More specifically, the DRAM controller 140 reads out the image data on the back side stored in the frame memory 135 in order from the top, the respective image data processing unit 146 to 150 apply image processing to the image data, and the transfer unit 151b sequentially captures the image data and passes the image data to the PCI transfer controller 152 for each unit of transfer. Then, the PCI transfer controller 152 transfers the image data to the local memory 116 through the PCI bus using a channel in which the DMAC 2 is set as a destination.

Thereafter, the CPU 132 continues the process until the transfer of the back side data ends (step S86) and, when the transfer ends ("Yes" at step S86), ends the back side data transfer process.

In this way, according to the third example, it is possible not only to simply transfer image data, which are read from both sides of an original in parallel, to the secondary storage side in parallel but also to select the parallel transfer or the sequential transfer according to a structure of the image information apparatus. Thus, even when a user can establish a structure of the apparatus freely, it is possible to improve efficiency of use of the entire image information apparatus as much as possible.

The communication path between the image reading units and the primary storage unit has been explained to be the PCI bus and the communication control unit, which controls communication via the communication path, has been explained to be the PCI transfer controller. However, the communication path can be a USB or an IEEE1394 bus and the communication control unit can be a USB transfer controller or an IEEE1394 transfer controller. Other communication paths and communication control units can also be used as long as plural transfer data with different transmission sources and transmission destinations can be mixed in the communication paths and the communication control units.

According to the present invention, the image information apparatus includes the secondary storage unit that saves image data stored in the primary storage unit that temporarily stores the image data. The image information apparatus further includes the communication path, which serves as a transfer path for image data on both sides of a double-sided original, and the communication control unit, which controls communication via the communication path, between the image reading units, which are capable of reading images on the front and the back sides of the double-sided original in parallel, and the primary storage unit. The image information apparatus can pass the read image data on both the sides to the communication control unit in parallel and individually. Thus, when the image data on both the sides are transferred, the image information apparatus can transfer the image data on the one side at arbitrary timing without adjusting the timing to transfer timing of the image data on the other side. Therefore, control by the image information apparatus is simplified and queuing for adjusting the timing for transferring the image data on the one side to the transfer timing of the image data on the other side is eliminated. As a result, transfer efficiency is also improved.

Moreover, the communication control unit can receive transfer requests from plural transfer request sources in parallel, the communication path can transfer respective image data from the plural transfer request sources in a mixed state, and the front side data transfer process and the back side data transfer process operating in parallel, which constitute the transfer control unit, can issue transfer requests to the communication control unit independently from each other. Thus, it is possible to realize the image information apparatus according to the first aspect of the invention easily.

Furthermore, the communication path is the PCI bus and the communication control unit is the PCI control unit that is capable of receiving transfer requests from plural transfer request sources in parallel. Thus, it is possible to realize the image information apparatus according to the first aspect of the invention easily.

Moreover, the communication path is the USB bus and the communication control unit is the USB control unit that is capable of receiving transfer requests from plural transfer request sources in parallel. Thus, it is possible to realize the image information apparatus according to the first aspect of the invention easily.

Furthermore, the communication path is the IEEE1394 bus and the communication control unit is the IEEE1394 control unit that is capable of receiving transfer requests from plural transfer request sources in parallel. Thus, it is possible to realize the image information apparatus according to the first aspect of the invention.

Moreover, when image data on both sides of an original are sent to the primary storage unit, it is possible to transfer the image data on both the sides in parallel or transfer the image data in time series. This makes it possible to perform parallel transfer and time series transfer according to circumstances. Therefore, it is possible to make the most of functions of the image input unit and improve efficiency of use of the entire image information apparatus.

Furthermore, it is possible to select whether image data on both sides of an original is to be transferred in parallel or transferred in time series according to a structure of the image information apparatus. Thus, it is possible to improve efficiency of use of the entire image information apparatus as much as possible even when a user can establish a structure of an apparatus freely.

Moreover, when the image reading units cannot transfer image data on both sides of an original sequentially, the selecting unit selects an operation for always transferring the image data on both the sides in parallel. Thus, even if the image reading units cannot transfer the image data on both the sides sequentially, it is possible to process the transfer of the image data without deficiency.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image information apparatus, comprising: at least two image reading units configured to read, in parallel, images on corresponding sides of a double-sided original document and acquire image data for each of the corresponding sides;
    a frame memory that temporarily stores the image data read by the at least two image reading units;
    at least two transfer control units, each of said transfer control units corresponding to one of the at least two image reading units, and configured to transmit, in parallel and individually, the image data acquired by the corresponding image reading unit and stored in the frame memory;
    a primary storage unit that temporarily stores therein the image data transferred by the at least two transfer control units;
    a secondary storage unit that receives the image data from the primary storage unit and stores therein the received image data;
    a communication control unit configured to receive the image data from each of the at least two transfer control units and to transmit, in parallel, the image data to the primary storage unit via a communication path; and
    a selecting unit configured to determine whether the image data corresponding to both sides of the double-sided original document is to be transferred in parallel or in time series according to a storage capacity of the frame memory apparatus, wherein when the at least two image reading units simultaneously read corresponding sides of the original document, if the storage capacity of the frame memory is less than a capacity required to store one page of the image data of the original document, the selecting unit determines parallel transfer of the image data and the at least two transfer control units transfer the image data in parallel, otherwise the selecting unit determines time series transfer of the image data, and the at least two transfer control units transfer the image data in time series.

2. The image information apparatus according to claim 1, wherein
    the communication control unit is configured to receive transfer requests from a plurality of transfer request sources in parallel,
    the communication path is configured to transfer respective image data from the transfer request sources in a mixed state,
    the at least two transfer control units include a first transfer control unit configured to perform a first data transfer process and a second transfer control unit configured to perform a second data transfer process, and
    each of the first data transfer process and the second data transfer process include sending transfer requests to the communication control unit independently from each other.

3. The image information apparatus according to claim 2, wherein
    the communication path is a peripheral component interconnect (PCI) bus, and
    the communication control unit is a PCI control unit configured to receive transfer requests from each of the plurality of transfer request sources in parallel.

4. The image information apparatus according to claim 2, wherein
    the communication path is a universal serial bus (USB), and
    the communication control unit is a USB control unit configured to receive transfer requests from each of the plurality of transfer request sources in parallel.

5. The image information apparatus according to claim 2, wherein
    the communication path is an IEEE1394 bus, and
    the communication control unit is an IEEE1394 control unit configured to receive transfer requests from each of the plurality of transfer request sources in parallel.

6. The image information apparatus according to claim 1, wherein the selecting unit is configured to always transfer the image data corresponding to both sides of the double-sided original document in parallel, when the image reading units cannot transfer the image data on both sides sequentially.

7. The image information apparatus according to claim 1, wherein the communication control unit is further configured to transfer data from the primary storage unit to the secondary storage unit.

8. A method for storing data in an image information apparatus, said method comprising:
reading, in parallel, images on corresponding sides of a double-sided original document and acquiring image data for each of the corresponding sides;
temporarily storing, in a frame memory, the image data read in the reading step;
determining whether the image data corresponding to both sides of the double-sided original document is to be transferred in parallel or in time series according to a storage capacity of the frame memory, wherein when both sides of the original document are read simultaneously, if the storage capacity of the frame memory is less than a capacity required to store one page of the image data of the original document, parallel transfer of the image data is determined; and
transferring the acquired image data to a secondary storage unit in parallel or in time series according to a result of the determining step.

9. The method of claim 8, further comprising:
transferring data from the primary storage unit to the secondary storage unit.

10. An image information apparatus, comprising:
image reading means for reading, in parallel, images on corresponding sides of a double-sided original document and acquiring image data for each of the corresponding sides;
a frame memory that temporarily stores the image data read by the at least two image reading units;
transfer control means for transmitting, in parallel and individually, the image data acquired by the image reading means and stored in the frame memory;
a primary storage unit that temporarily stores therein the image data transferred by the transfer control means;
a secondary storage unit that receives the image data from the primary storage unit and stores therein the received image data;
communication control means for receiving the image data from transfer control means and for transmitting, in parallel, the image data to the primary storage means; and
selecting means for determining whether the image data corresponding to both sides of the double-sided original document is to be transferred in parallel or in time series according to a storage capacity of the frame memory, wherein when the image reading means simultaneously reads corresponding sides of the original document, if the storage capacity of the frame memory is less than a capacity required to store one page of the image data of the original document, the means for selecting determines parallel transfer of the image data and the transfer control means transfers the image data in parallel.

11. The image information apparatus according to claim 10, wherein the communication control means transfers data from the primary storage means to the secondary storage means.

* * * * *